(12) United States Patent
Rollow, IV et al.

(10) Patent No.: US 11,064,291 B2
(45) Date of Patent: *Jul. 13, 2021

(54) MICROPHONE ARRAY SYSTEM

(71) Applicant: Sennheiser electronic GmbH & Co. KG, Wedemark (DE)

(72) Inventors: J. Douglas Rollow, IV, San Francisco, CA (US); Lance Reichert, San Francisco, CA (US); Daniel Voss, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 21 days.

This patent is subject to a terminal disclaimer.

(21) Appl. No.: 16/666,567

(22) Filed: Oct. 29, 2019

(65) Prior Publication Data
US 2020/0068297 A1 Feb. 27, 2020

Related U.S. Application Data

(63) Continuation-in-part of application No. 15/780,787, filed as application No. PCT/EP2016/079720 on Dec. (Continued)

(51) Int. Cl.
*H04R 1/02* (2006.01)
*H04R 3/00* (2006.01)
(Continued)

(52) U.S. Cl.
CPC ............ *H04R 1/406* (2013.01); *H04R 3/005* (2013.01); *H04R 3/04* (2013.01);
(Continued)

(58) Field of Classification Search
CPC .......... H04R 1/406; H04R 3/005; H04R 3/04; H04R 2201/401; H04R 2201/405; H04R 2430/23
(Continued)

(56) References Cited

U.S. PATENT DOCUMENTS

| 4,429,190 A | 1/1984 | Stockbridge |
| 4,923,032 A | 5/1990 | Nuernberger |
(Continued)

FOREIGN PATENT DOCUMENTS

| CN | 1426667 | 6/2003 |
| CN | 2922349 | 7/2007 |
(Continued)

OTHER PUBLICATIONS

International Search Report for Application No. PCT/EP2016/079720 dated May 29, 2017.
(Continued)

*Primary Examiner* — Ammar T Hamid
(74) *Attorney, Agent, or Firm* — Haug Partners LLP

(57) ABSTRACT

A microphone array system or microphone array unit for a conference system is provided that includes a front board, side walls and a plurality of microphone capsules arranged in or on the front board mountable on or in a ceiling of a conference room. The microphone array system or unit is adapted for generating a steerable beam within a maximum detection angle range. The microphone array system or microphone array unit includes a processing unit which is configured to receive the output signals of the microphone capsules and to steer the beam based on the received output signal of the microphone array. The processing unit is configured to control the microphone array to limit the detection angle range to exclude at least one predetermined exclusion sector in which a noise source is located.

16 Claims, 13 Drawing Sheets

Related U.S. Application Data 5, 2016, now Pat. No. 10,834,499, which is a continuation of application No. 14/959,387, filed on Dec. 4, 2015, now Pat. No. 9,894,434.

(51) Int. Cl.
*H04R 1/40* (2006.01)
*H04R 3/04* (2006.01)

(52) U.S. Cl.
CPC .. *H04R 2201/401* (2013.01); *H04R 2201/405* (2013.01); *H04R 2430/23* (2013.01)

(58) Field of Classification Search
USPC .......................................................... 381/92
See application file for complete search history.

(56) References Cited

U.S. PATENT DOCUMENTS

| | | | |
|---|---|---|---|
| 5,602,962 | A | 2/1997 | Kellermann |
| 6,307,942 | B1 | 10/2001 | Azima et al. |
| 6,510,919 | B1 | 1/2003 | Roy et al. |
| 6,731,334 | B1 | 5/2004 | Maeng et al. |
| 6,965,679 | B1 | 11/2005 | Lopez Bosio et al. |
| 7,995,731 | B2 | 8/2011 | Vernick |
| 10,834,499 | B2 * | 11/2020 | Rollow, IV .............. H04R 3/04 |
| 2006/0013417 | A1 | 1/2006 | Bailey et al. |
| 2006/0034469 | A1 | 2/2006 | Tamiya et al. |
| 2006/0165242 | A1 | 7/2006 | Miki et al. |
| 2007/0269071 | A1 | 11/2007 | Hooley |
| 2008/0247567 | A1 | 10/2008 | Kjolerbakken et al. |
| 2010/0215189 | A1 | 8/2010 | Marton |
| 2012/0076316 | A1 | 3/2012 | Zhu et al. |
| 2013/0029684 | A1 | 1/2013 | Kawaguchi et al. |
| 2013/0034241 | A1 | 2/2013 | Pandey et al. |
| 2013/0039504 | A1 | 2/2013 | Pandey et al. |
| 2014/0286504 | A1 * | 9/2014 | Iwai .......................... H04R 1/02 381/86 |
| 2015/0055797 | A1 | 2/2015 | Nguyen et al. |
| 2016/0323668 | A1 * | 11/2016 | Abraham ............... H04R 1/406 |

FOREIGN PATENT DOCUMENTS

| | | |
|---|---|---|
| CN | 101297587 | 10/2008 |
| CN | 102821336 | 12/2012 |
| CN | 102831898 | 12/2012 |
| CN | 202649819 | 1/2013 |
| CN | 103583054 | 2/2014 |
| EP | 1 439 526 | 7/2004 |
| EP | 1 651 001 | 4/2006 |
| EP | 2 197 219 | 6/2010 |
| JP | 61-296896 | 12/1986 |
| JP | 03-127598 | 5/1991 |
| JP | 05-153582 | 6/1993 |
| JP | 08-286680 | 11/1996 |
| JP | 11-136656 | 5/1999 |
| JP | 2002-031674 | 1/2002 |
| JP | 2003-250192 | 9/2003 |
| JP | 2007-256606 | 10/2007 |
| JP | 2007-259088 | 10/2007 |
| JP | 2007-274131 | 10/2007 |
| JP | 2010-213091 | 9/2010 |
| JP | 2013-072919 | 4/2013 |
| WO | WO 2003/010996 | 2/2003 |
| WO | WO 2005/020628 | 3/2005 |
| WO | WO 2008/002931 | 1/2008 |
| WO | WO 2012/160459 | 11/2012 |

OTHER PUBLICATIONS

Written Opinion for Application No. PCT/EP2016/079720 dated May 29, 2017.
Lowell LT Series Ceiling Tile Speaker, Apr. 19, 2006.
Ikeda et al., 2D Sound Source Localization in Azimuth & Elevation from Microphone Array by Using a Directional Pattern of Element Oct. 2007, IEEE Sensors Conference.
Fullsound, Ceiling Microphone, CTG Audio CM-01 Data Sheet dated Jun. 5, 2008.
Sasaki et al., "Predefined Command Recognition System Using a Ceiling Microphone Array in Noisy Housing Environments", dated Sep. 22, 2008, IEEE/RSJ International Conference on Intelligent Robots and Systems.
The Unknown Journey an autobiography of Spessard Boatright, Dec. 23, 2008.
Polycom HDX Ceiling Microphone Array, Extraordinary room coverage with superior audio pickup, 2009, *Polycom, Inc.*
Audix Microphones, Audix Website—M70 Description, 2012.
ClearOne Website—Beamforming Microphone Array, Jun. 1, 2012.
Soda et al., "Handsfree voice interface for home network service using a microphone array network" dated Dec. 2012, Third International Conference on Networking and Computing.
All-in-one Drop Ceiling Simplicity—https://web.archive.org/web/20130512034819, May 2013 TopCat Audio System, TopCat—Ceiling Speaker & Wireless Sound System for Classrooms.
TopCat Classroom Audio System User Manual dated Sep. 2011, www. lightspeed-tek.com.
Sound Advance Systems Speaker Tile Data Sheet dated May 1998.
Macomber, Dwight Frank, "Design Theory of Microphone Arrays for Teleconferenced", A dissertation in Electrical Engineering, *ProQuest*, 2001.
I-Ceiling Wireless Systems Brochure, 2002 Armstrong World Industries.
I-Ceiling Speaker Data Page, AWI Licensing Company, 2005.
CTG FS-03 Fullsound Installation & Operation Manual, FS-03 System, Jan. 2006.
Kagami et al., "Home Robot Service by Ceiling Ultrasonic Locator and Microphone Array", May 2006, Proceedings of the 2006 IEEE International Conference on Robotics and Automation.
Search Report for Application CN Application No. 201680070773.4 dated Nov. 18, 2019.
Notification of the First Office Action for CN Application No. 201680070773.4 dated Nov. 26, 2019.
U.S. Final Office issued in corresponding U.S. Appl. No. 15/780,787 dated Apr. 9, 2020.

* cited by examiner

MICROPHONE ARRAY SYSTEM

The present application is a continuation-in-part of U.S. patent application Ser. No. 15/780,787 which is a national phase of International Patent Application No. PCT/EP2016/079720 filed on Dec. 5, 2016, which claims priority from U.S. patent application Ser. No. 14/959,387 filed on Dec. 4, 2015, the disclosures of which are incorporated herein by reference in their entirety.

FIELD OF THE INVENTION

It is noted that citation or identification of any document in this application is not an admission that such document is available as prior art to the present invention.

The invention relates to a microphone array system that may be used in a conference system.

In a conference system, the speech signal of one or more participants, typically located in a conference room, must be acquired such that it can be transmitted to remote participants or for local replay, recording or other processing.

FIG. 1A shows a schematic representation of a first conference environment as known from the prior art. The participants of the conference are sitting at a table 1020 and a microphone 1110 is arranged in front of each participant 1010. The conference room 1001 may be equipped with some disturbing sound source 1200 as depicted on the right side. This may be some kind of fan cooled device like a projector or some other technical device producing noise. In many cases those noise sources are permanently installed at a certain place in the room 1001.

Each microphone 1100 may have a suitable directivity pattern, e.g. cardioid, and is directed to the mouth of the corresponding participant 1010. This arrangement enables predominant acquisition of the participants' 1010 speech and reduced acquisition of disturbing noise. The microphone signals from the different participants 1010 may be summed together and can be transmitted to remote participants. A disadvantage of this solution is the microphone 1100 requiring space on the table 1020, thereby restricting the participants work space. Furthermore, for proper speech acquisition the participants 1010 have to stay at their seat. If a participant 1010 walks around in the room 1001, e.g. for using a whiteboard for additional explanation, this arrangement leads to degraded speech acquisition results.

FIG. 1B shows a schematic representation of a conference environment according to the prior art. Instead of using one installed microphone for each participant, one or more microphones 1110 are arranged for acquiring sound from the whole room 1001. Therefore, the microphone 1110 may have an omnidirectional directivity pattern. It may either be located on the conference table 1020 or e.g. ceiling mounted above the table 1020 as shown in FIG. 1B. The advantage of this arrangement is the free space on the table 1020. Furthermore, the participants 1010 may walk around in the room 1001 and as long as they stay close to the microphone 1110, the speech acquisition quality remains at a certain level. On the other hand, in this arrangement disturbing noise is always fully included in the acquired audio signal. Furthermore, the omnidirectional directivity pattern results in noticeable signal to noise level degradation at increased distance from the speaker to the microphone.

FIG. 1C shows a schematic representation of a further conference environment according to the prior art. Here, each participant 1010 is wearing a head mounted microphone 1120. This enables a predominant acquisition of the participants' speech and reduced acquisition of disturbing noise, thereby providing the benefits of the solution from FIG. 1A. At the same time the space on the table 1020 remains free and the participants 1010 can walk around in the room 1001, as known from the solution of FIG. 1B. A significant disadvantage of this third solution consists in a protracted setup procedure for equipping every participant with a microphone and for connecting the microphones to the conference system.

US 2008/0247567 A1 shows a two-dimensional microphone array for creating an audio beam pointing to a given direction.

U.S. Pat. No. 6,731,334 B1 shows a microphone array used for tracking the position of a speaking person for steering a camera.

SUMMARY OF THE INVENTION

It is an object of the invention to provide a microphone array system or a microphone array unit for a conference system that enables enhanced freedom of the participants at improved speech acquisition and a reduced setup effort.

According to the invention, a microphone array system is provided which is mountable on or in a ceiling of a conference room and comprises a front board serving as a carrier board, side walls and a plurality of microphone capsules arranged in or on the front board. The microphone array system is adapted for generating a steerable beam within a maximum detection angle range. The microphone array system may comprise a processing unit that is configured to receive the output signals of the microphone capsules and to steer the beam based on the received output signal of the microphone array system. In an embodiment, the processing unit is also configured to control the microphone array system to limit the detection angle range to exclude at least one predetermined exclusion sector in which a noise source is located.

The processing unit is configured to detect a position of an audio source based on the output signals of the microphone array unit. The processing unit comprises a direction recognition unit which is configured to identify a direction of an audio source and to output a directional signal. According to an aspect of the invention, the processing unit comprises filters for each microphone signal, delay units configured to individually add an addressable delay to the output of the filters, a summing unit configured to sum the outputs of the delay units and an optional frequency response correction filter configured to receive the output of the summing unit and to output an overall output signal of the processing unit. According to this aspect, the processing unit also comprises a delay control unit configured to receive the direction signal and to convert directional information into delay values for the delay units. The delay units are configured to receive those delay values and to adjust their delay time accordingly.

According to an aspect of the invention, the processing unit comprises a correction control unit configured to receive the directional signal from the directional recognition unit and to convert the direction information into a correction control signal which is used to adjust the optional frequency response correction filter. The frequency response correction filter can be performed as an adjustable equalizing wherein the equalizing is adjusted based on the dependency of the frequency response of the audio source to the direction of the audio beam. The optional frequency response correction filter is configured to compensate deviations from a desired amplitude frequency response by a filter having an inverted amplitude frequency response.

In the microphone array system, a plurality of microphone capsules are arranged in or on a carrier board mountable in or on a ceiling in a conference room. The carrier board may be made of a sound-reflecting material and at least has a sound-reflecting surface. The board comprises an upper side, a lower side and a plurality of first openings. The microphone capsules are arranged on one side of the board in close distance to the surface, wherein the microphone capsules are arranged in connection lines from a corner of the board to the center of the board. Starting at the center, the distance between two neighboring microphone capsules along the connection line is increasing with increasing distance from the center. The microphone array system further has side walls extending on the upper side of the carrier board, a plurality of microphone capsules arranged in or on the carrier board, wherein the microphone capsules are located at the first openings of the carrier board, and a processing unit configured to receive output signals of the microphone capsules and to execute audio beam forming based on the received output signals of the microphone capsules for predominantly acquiring sound coming from an audio source in a first direction. Each microphone capsule is sealed against the carrier board, so that the microphone capsules can acquire only sound entering through the first openings of the carrier board.

According to an aspect of the invention, the processing unit comprises filters for each microphone signal, delay units configured to individually add an adjustable delay to the output of the filters, a summing unit configured to sum the outputs of the delay units and, optionally, a frequency response correction filter configured to receive the output of the summing unit and to output an overall output signal of the processing unit. The processing unit comprises a direction recognition unit which is configured to identify a direction of an audio source based on a "Steered Response Power with Phase Transformation" (SRP-PHAT) algorithm and to output a direction signal. By successfully repeating the summation of the outputs of the delay units over several points in space as part of a predefined search grid, an SRP score is determined by the direction recognition unit for each search grid point in space. The position of the highest SRP score is considered as a position of an audio source. If a block of signals achieves an SRP score of less than a threshold, the beam can be kept at a last valid position to give a maximum SRP score above the threshold.

BRIEF DESCRIPTION OF THE DRAWINGS

Advantages and embodiments of the invention are elucidated by the following figures.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments. It is to be noted that the terms microphone array unit and microphone array system are used synonymously herein.

Figure 1A:
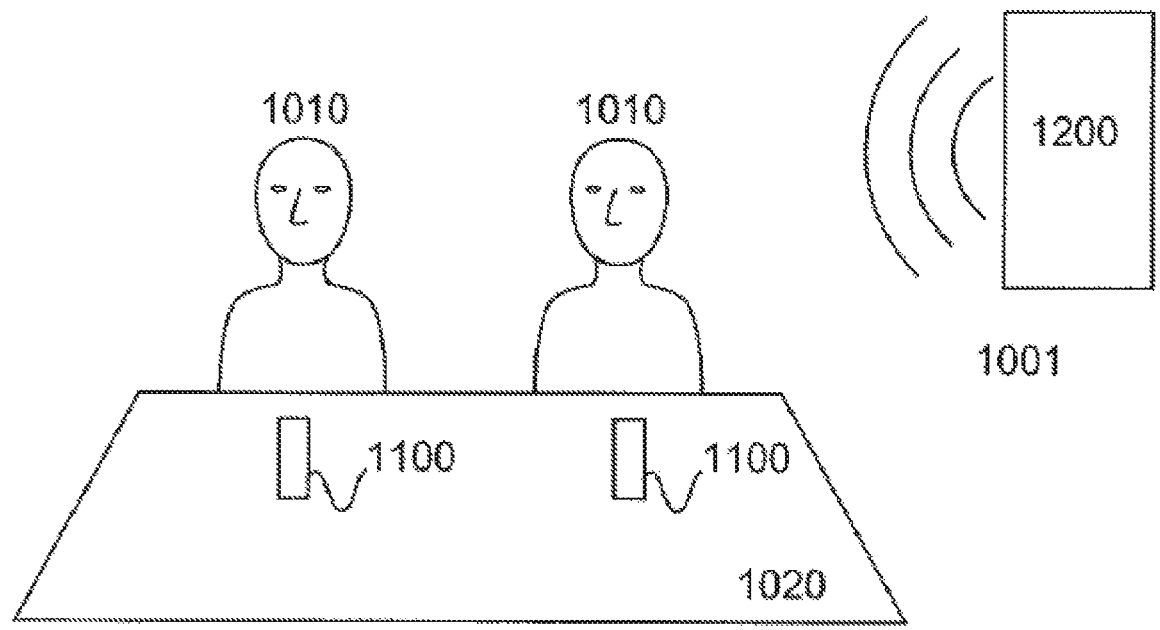
FIG. 1A shows a schematic representation of a first conference environment as known from the prior art.
Figure 1B:
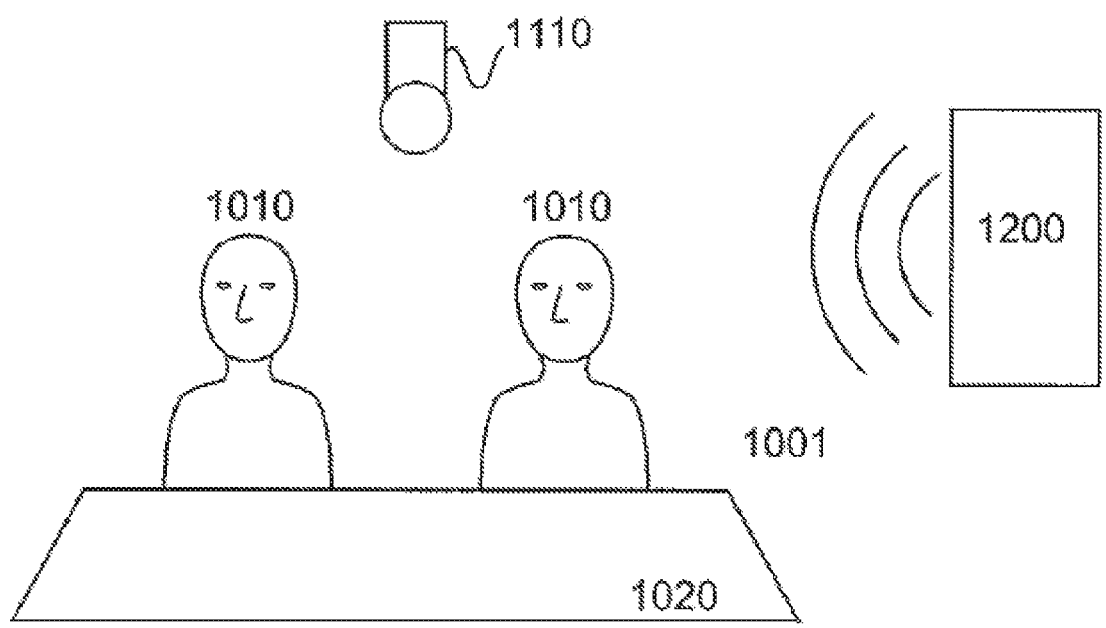
FIG. 1B shows a schematic representation of a conference environment according to the prior art.
Figure 1C:
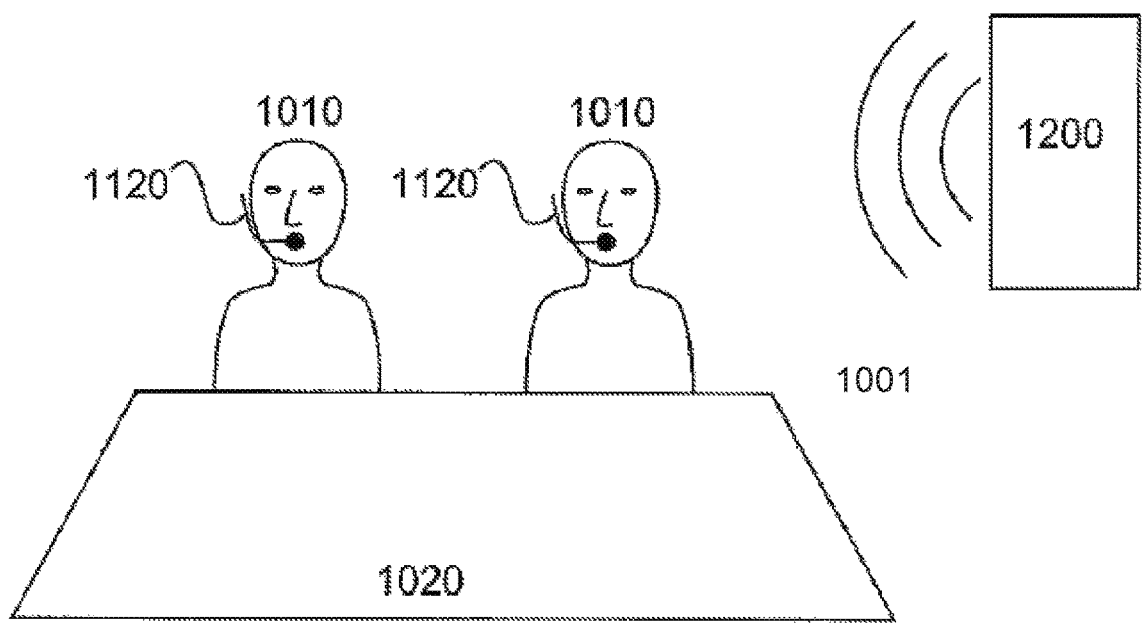
FIG. 1C shows a schematic representation of a further conference environment according to the prior art.
Figure 2:
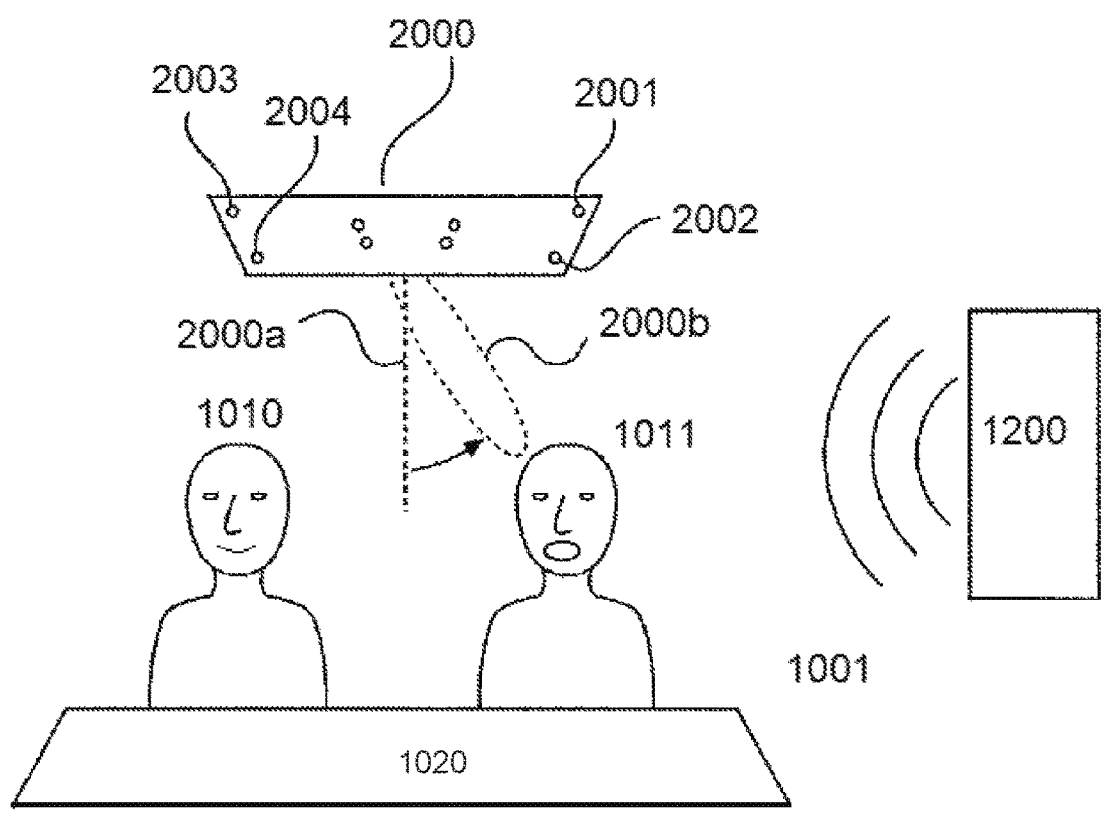
FIG. 2 shows a schematic representation of a conference room with a microphone array according to the invention.

FIG. 2 shows a schematic representation of a conference room with a microphone array system according to the invention. A microphone array 2000 can be mounted above the conference table 1020 or rather above the participants 1010, 1011. The microphone array 2000 is thus preferably ceiling mounted. The microphone array 2000 comprises a plurality of microphone capsules 2001-2004 preferably arranged in a two dimensional configuration. The microphone array has an axis 2000a and can have a beam 2000b.

The audio signals acquired by the microphone capsules 2001-2004 are fed to a processing unit 2400 of the microphone array unit 2000. Based on the output signals of the microphone capsules, the processing unit 2400 identifies the direction (a spherical angle relating to the microphone array; this may include a polar angle and an azimuth angle; optionally a radial distance) in which a speaking person is located. The processing unit 2400 then executes an audio beam 2000b forming based on the microphone capsule signals for predominantly acquiring sound coming from the direction as identified.

The direction of the speaking person can periodically be re-identified and the microphone beam direction 2000b can be continuously adjusted accordingly. The whole system can be preinstalled in a conference room and preconfigured so that no certain setup procedure is needed at the start of a conference for preparing the speech acquisition. At the same time the speaking person tracing enables a predominant acquisition of the participants' speech and reduced acquisition of disturbing noise. Furthermore, the space on the table remains free and the participants can walk around in the room at a constantly high speech acquisition quality.

Figure 3:
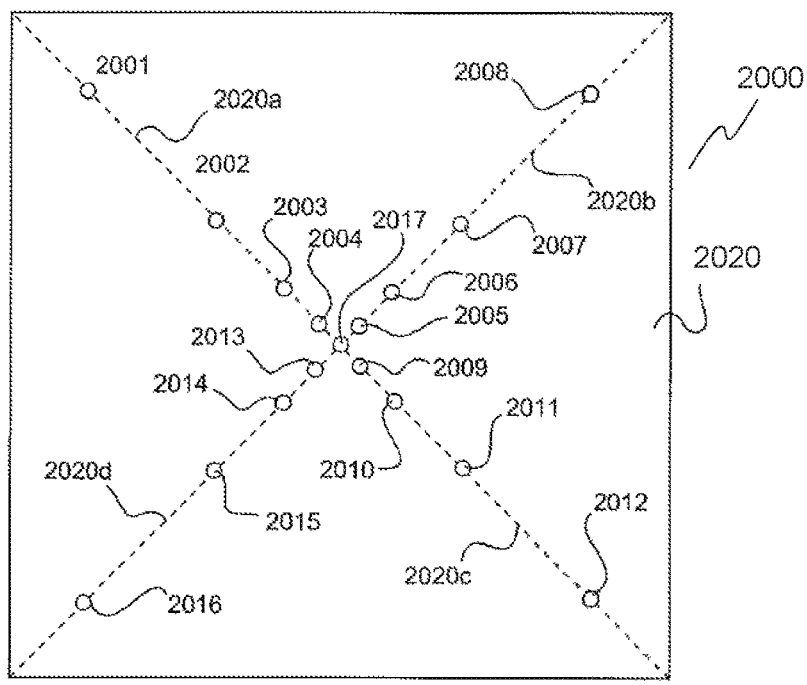
FIG. 3 shows a schematic representation of a microphone array according to the invention.

FIG. 3 shows a schematic representation of a microphone array unit according to the invention. The microphone array 2000 consists of a plurality of microphone capsules 2001-2007 and a (flat) carrier board 2020. The carrier board 2020 features a closed plane surface, preferably larger than 30 cm×30 cm in size. The capsules 2001-2017 are preferably arranged in a two dimensional configuration on one side of the surface in close distance to the surface (<3 cm distance between the capsule entrance and the surface; optionally the capsules 2001-2017 are inserted into the carrier board 2020 for enabling zero distance). The carrier board 2020 is closed in such a way that sound can reach the capsules from the surface side, but sound is blocked away from the capsules from the opposite side by the closed carrier board. This is advantageous as it prevents the capsules from acquiring reflected sound coming from a direction opposite to the surface side. Furthermore, the surface provides a 6 dB pressure gain due to the reflection at the surface and thus increased signal to noise ratio.

The carrier board 2020 can optionally have a square shape. Preferably it is mounted to the ceiling in a conference room in a way that the surface is arranged in a horizontal orientation. On the surface directing down from the ceiling the microphone capsules are arranged. FIG. 3 shows a plane view of the microphone surface side of the carrier board (from the direction facing the room).

Here, the capsules are arranged on the diagonals of the square shape. There are four connection lines 2020a-2020d, each starting at the middle point of the square and ending at one of the four edges of the square. Along each of those four lines 2020a-2020d a number of microphone capsules 2001-2017 is arranged in a common distance pattern. Starting at the middle point the distance between two neighboring capsules along the line is increasing with increasing distance from the middle point. Preferably, the distance pattern represents a logarithmic function with the distance to the middle point as argument and the distance between two neighboring capsules as function value. Optionally a number of microphones which are placed close to the center have an equidistant linear spacing, resulting in an overall linear-logarithmic distribution of microphone capsules.

The outermost capsule (close to the edge) 2001, 2008, 2016, 2012 on each connection line still keeps a distance to the edge of the square shape (at least the same distance as the distance between the two innermost capsules). This enables the carrier board to also block away reflected sound from the outermost capsules and reduces artifacts due to edge diffraction if the carrier board is not flush mounted into the ceiling.

Optionally the microphone array further comprises a cover for covering the microphone surface side of the carrier board and the microphone capsules. The cover may be designed to be acoustically transparent, so that the cover does not have a substantial impact on the sound reaching the microphone capsules.

Preferably all microphone capsules are of the same type, so that they feature the same frequency response and the same directivity pattern. The preferred directivity pattern for the microphone capsules 2001-2017 is omnidirectional as this provides as close as possible a sound incident angle independent frequency response for the individual microphone capsules. However, other directivity patterns are possible.

Specifically cardioid pattern microphone capsules can be used to achieve better directivity, especially at low frequencies. The capsules are preferably arranged mechanically parallel to each other in the sense that the directivity pattern of the capsules all point into the same direction. This is advantageous as it enables the same frequency response for all capsules at a given sound incidence direction, especially with respect to the phase response.

In situations where the microphone system is not flush mounted in the ceiling, further optional designs are possible.

Figure 4A:
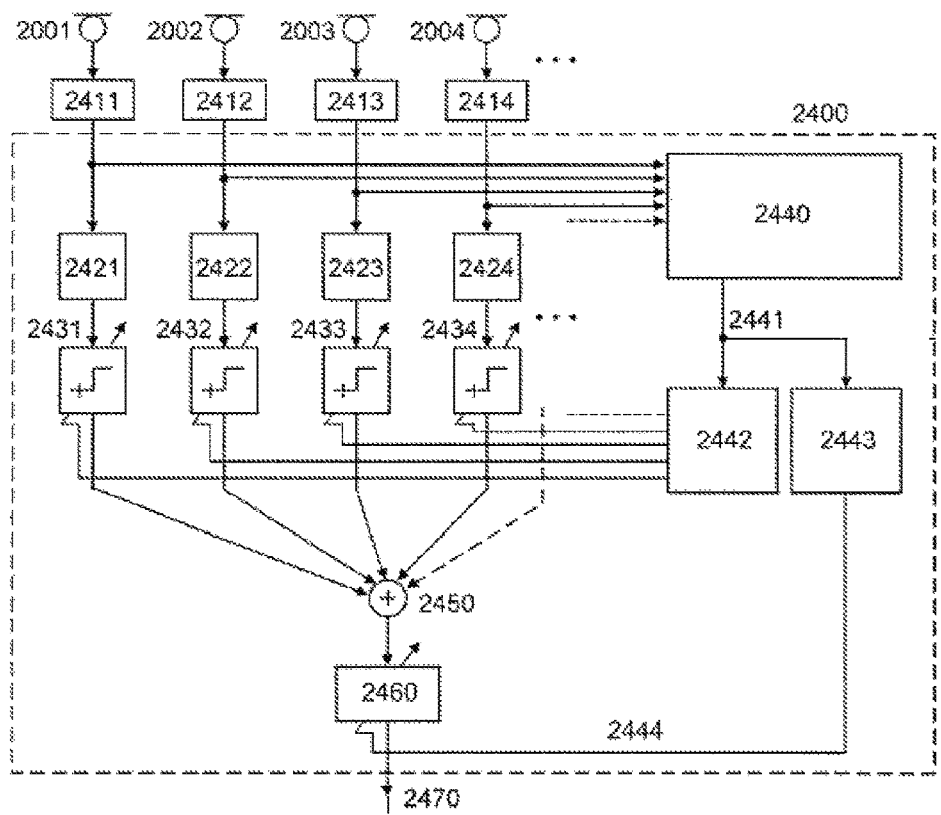
FIGS. 4A and 4B show a block diagram of a processing unit of the microphone array according to embodiments of the invention.

FIG. 4A shows a block diagram of a processing unit of the microphone array system according to embodiments of the invention. The audio signals acquired by the microphone capsules 2001-2017 are fed to a processing unit 2400. On top of FIG. 4A only four microphone capsules 2001-2004 are depicted. They stand as placeholder for the complete plurality of microphone capsules of the microphone array and a corresponding signal path for each capsule is provided in the processing unit 2400. The audio signals acquired by the capsules 2001-2004 are each fed to a corresponding analog/digital converter 2411-2414. Inside the processing unit 2400, the digital audio signals from the converters 2411-2414 are provided to a direction recognition unit 2440. The direction recognition unit 2440 identifies the direction in which a speaking person is located as seen from the microphone array 2000 and outputs this information as a direction signal 2441. The direction signal 2441 or direction information may e.g. be provided in Cartesian coordinates or in spherical coordinates including an elevation angle and an azimuth angle. Furthermore, the distance to the speaking person may be provided as well.

The processing unit 2400 furthermore comprises individual filters 2421-2424 for each microphone signal. The output of each individual filters 2421-2424 is fed to an individual delay unit 2431-2434 for individually adding an adjustable delay to each of those signals. The outputs of all those delay units 2431-2434 are summed together in a summing unit 2450. The output of the summing unit 2450 is fed to a frequency response correction filter 2460. The output signal of the summing unit 2450 or of the optional frequency response correction filter 2460 represents the overall output signal 2470 of the processing unit 2400. This is the signal representing a speaking person's voice signal coming from the identified direction.

Directing the audio beam to the direction as identified by the direction recognition unit 2440 in the embodiment of FIG. 4A can optionally be implemented in a "delay-and-sum" approach by the delay units 2431-2434. The processing unit 2400 therefore includes a delay control unit 2442 for receiving the direction information 2441 and for converting this into delay values for the delay units 2431-2434. The delay units 2431-2434 are configured to receive those delay values and to adjust their delay time accordingly.

Figure 4B:
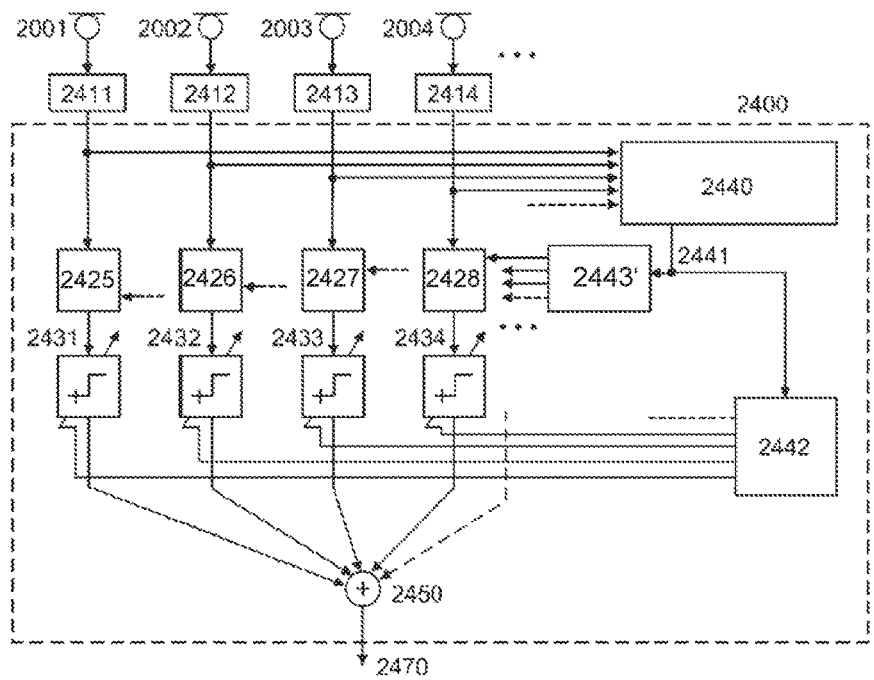

The processing unit 2400 furthermore comprises a correction control unit 2443 in this embodiment. The correction control unit 2443 receives the direction information 2441 from the direction recognition unit 2440 and converts it into a correction control signal 2444. The correction control signal 2444 is used to adjust the frequency response correction filter 2460. The frequency response correction filter 2460 can be performed as an adjustable equalizing unit. The setting of this equalizing unit is based on the finding that the frequency response as observed from the speaking person's voice signal to the output of the summing unit 2450 is dependent on the direction the audio beam 2000b is directed to. Therefore, the frequency response correction filter 2460 is configured to compensate deviations from a desired amplitude frequency response by a filter 2460 having an inverted amplitude frequency response. In an alternative embodiment, the frequency correction can be performed individually for each microphone capsule. This can be performed by the individual filters directly, so that the optional frequency correction filter 2460 can be omitted, as shown in FIG. 4B. Individual filters 2425-2428 are similar to individual filters 2421-2424, but can be adjusted according to correction signals received from the correction control unit 2443'. The correction signals may in this case indicate a direction of a plurality of predefined directions in space, in one embodiment. The processing unit 2400 and each of the units contained therein may be implemented by one or more microprocessors that may be configured by software.

The position or direction recognition unit 2440 detects the position of audio sources by processing the digitized signals of at least two of the microphone capsules as depicted in FIG. 4. This task can be achieved by several algorithms. Preferably the SRP-PHAT (Steered Response Power with PHAse Transform) algorithm is used, as known from prior art.

When a microphone array with a conventional "Delay-and-Sum" Beamformer (DSB) is successively steered at points in space by adjusting its steering delays, the output power of the beamformer can be used as a measure indicating where a source is located. The steered response power (SRP) algorithm performs this task by calculating generalized cross correlations (GCC) between pairs of input signals and comparing them against a table of expected time difference of arrival (TDOA) values. If the signals of two microphones are practically time delayed versions of each other, which will be the case for two microphones picking up the direct path of a sound source in the far field, their GCC will have a distinctive peak at the position corresponding to the TDOA of the two signals and it will be close to zero for all other positions. SRP uses this property to calculate a score by summing the GCCs of a multitude of microphone pairs at the positions of expected TDOAs, corresponding to a certain position in space. By successively repeating this summation over several points in space that are part of a pre-defined search grid, an SRP score is gathered for each point in space. The position with the highest SRP score is considered as the sound source position.

Figure 5:
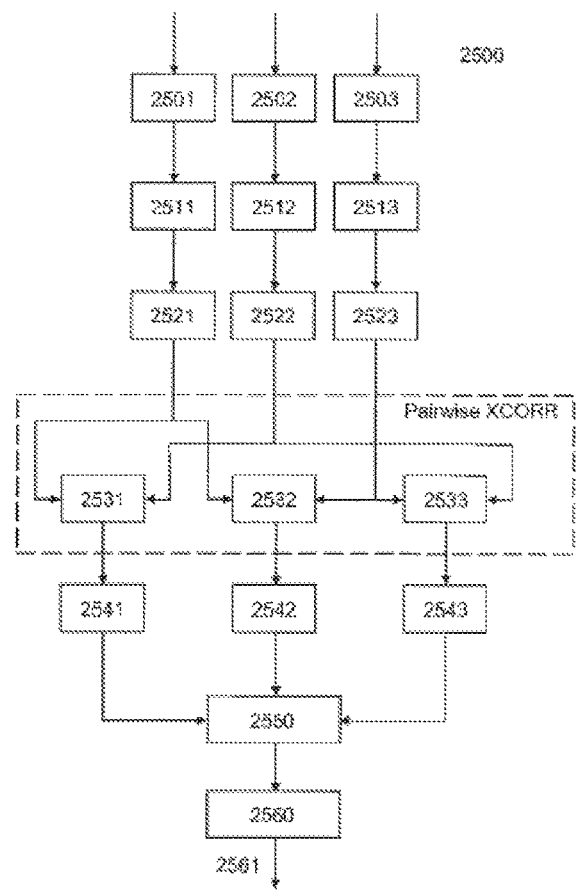
FIG. 5 shows the functional structure of the SRP-PHAT algorithm as implemented in the microphone system in one embodiment.

FIG. 5 shows the functional structure of the SRP-PHAT algorithm as implemented in the microphone array system in an embodiment. At the top only three input signals are shown that stand as placeholders for the plurality of input signals fed to the algorithm. The cross correlation can be performed in the frequency domain. Therefore blocks of digital audio data from a plurality of inputs are each multiplied by an appropriate window 2501-2503 to avoid artifacts and transformed into the frequency domain 2511-2513. The block length directly influences the detection performance. Longer blocks achieve better detection accuracy of position-stationary sources, while shorter blocks allow for more accurate detection of moving sources and less delay. Preferably the block length is set to values allowing that each part of spoken words can be detected fast enough while still being accurate in position. Thus preferably a block length of about 20-100 ms is used.

Afterwards, the phase transform 2521-2523 and pairwise cross-correlation of signals 2531-2533 is performed before transforming the signals into the time domain again 2541-2543. These GCCs are then fed into the scoring unit 2550. The scoring unit computes a score for each point in space on a pre-defined search grid. The position in space that achieves the highest score is considered to be the sound source position.

By using a phase transform weighting for the GCCs, the algorithm can be made more robust against reflections, diffuse noise sources and head orientation. In the frequency domain, the phase transform as performed in the units 2521-2523 divides each frequency bin with its amplitude, leaving only phase information. In other words the amplitudes are set to "1" for all frequency bins.

The SRP-PHAT algorithm as described above and known from prior art has some disadvantages that are improved in the context of this invention.

In a typical SRP-PHAT scenario, the signals of all microphone capsules of an array will be used as inputs to the SRP-PHAT algorithm, all possible pairs of these inputs will be used to calculate GCCs and the search grid will be densely discretizing the space around the microphone array. All this leads to very high amounts of processing power required for the SRP-PRAT algorithm.

According to an aspect of the invention, various techniques are introduced to reduce the processing power needed without sacrificing for detection precision. In contrast to using the signals of all microphone capsules and all possible microphone pairs, preferably a subset of microphones can be chosen as inputs to the algorithm or particular microphone pairs can be chosen to calculate GCCs of. By choosing microphone pairs that give good discrimination of points in space, the processing power can be reduced while keeping a high amount of detection precision.

As the microphone array system according to the invention only requires a look direction to point to a source, it is further not desirable to discretize the whole space around the microphone array into a search grid, as distance information is not necessarily needed. If a hemisphere with a radius much larger than the distance between the microphone capsules used for the GCC pairs is used, it is possible to detect the direction of a source very precisely, while at the same time reducing the processing power significantly, as only a hemisphere search grid is to be evaluated. Furthermore, the search grid is independent from room size and geometry and risk of ambiguous search grid positions e.g. if a search grid point would be located outside of the room. Therefore, this solution is also advantageous to prior art solutions to reduce the processing power like coarse to fine grid refinement, where first a coarse search grid is evaluated to find a coarse source position and afterwards the area around the detected source position will be searched with a finer grid to find the exact source position.

It can be desirable to also have distance information of the source, in order to e.g. adapt the beamwidth to the distance of the source to avoid a too narrow beam for sources close to the array or in order to adjust the output gain or EQ according to the distance of the source.

Figure 6A:
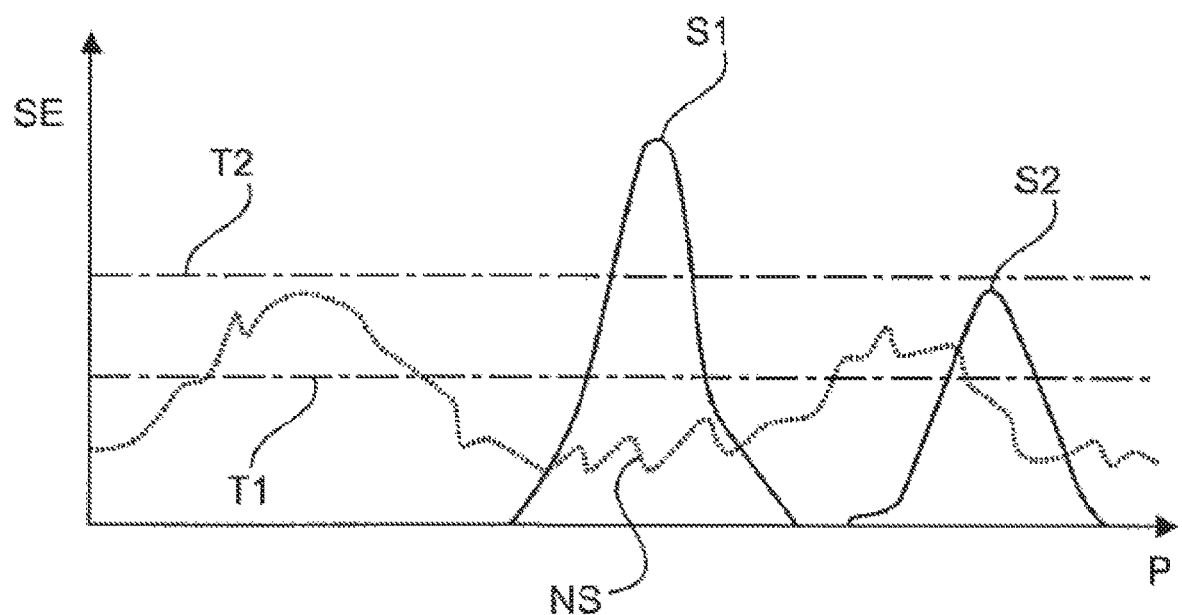
FIG. 6A shows a graph indicating a relation between a sound energy and a position.

Besides of significantly reducing the required processing power of typical SRP-PHAT implementations, the robustness against disturbing noise sources may be improved by a set of measures. If there is no person speaking in the vicinity of the microphone system and the only signals picked up are noise or silence, the SRP-PRAT algorithm will either detect a noise source as source position or, especially in the case of diffuse noises or silence, quasi randomly detect a "source" anywhere on the search grid. This either leads to predominant acquisition of noise or audible audio artifacts due to a beam randomly pointing at different positions in space with each block of audio. It is known from prior art that this problem can be solved to some extent by computing the input power of at least one of the microphone capsules and to only steer the beam if the input power is above a certain threshold. The disadvantage of this method is that the threshold has to be adjusted very carefully depending on the noise floor of the room and the expected input power of a speaking person. This requires interaction with the user or at least time and effort during installation. This behavior is depicted in FIG. 6A. Setting the sound energy threshold to a first threshold T1 results in noise being picked up, while the stricter threshold setting of a second threshold T2 misses a second source S2. Furthermore, the computation of input power requires some CPU usage, which is usually a limiting factor for automatically steered microphone array systems and thus needs to be saved wherever possible.

Figure 6B:
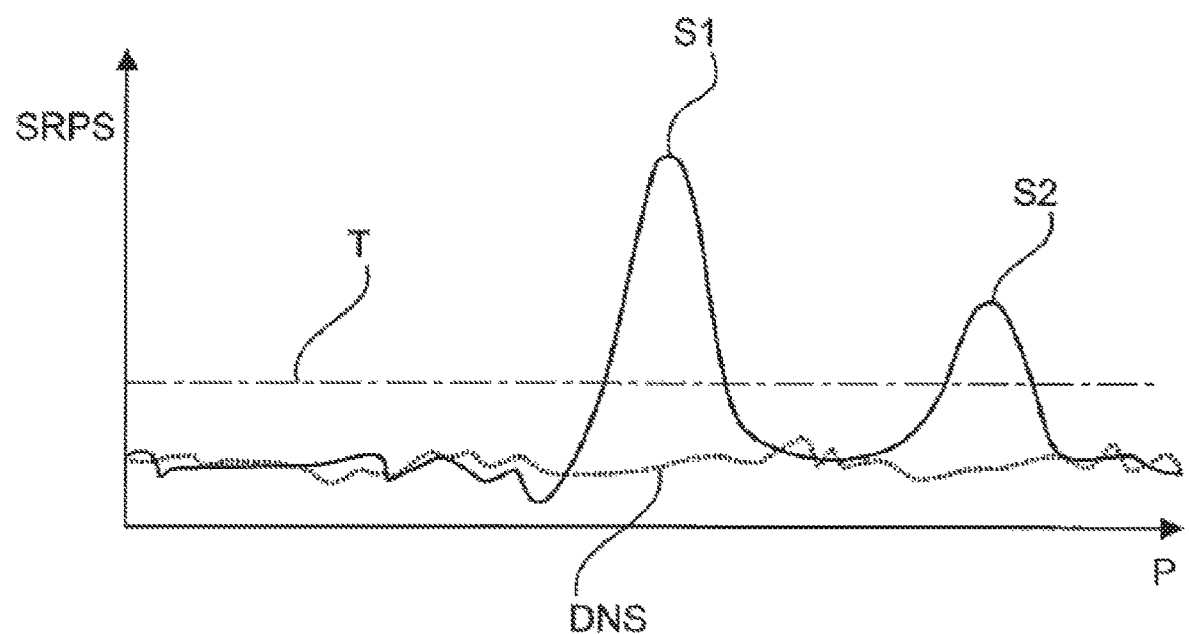
FIG. 6B shows a graph indicating a relation between an SRP score and a position.

This problem may be overcome by using the SRP score that is already computed for the source detection as a threshold metric (SRP-threshold), instead of or in addition to the input power. The SRP-PHAT algorithm is insensitive to reverberation and other noise sources with a diffuse character. In addition, most noise sources as e.g. air conditioning systems have a diffuse character while sources to be detected by the system usually have a strong direct sound path, or at least a reflected sound path. Thus, most noise sources will produce rather low SRP scores, while a speaking person will produce much higher scores. This is mostly independent of the room and installation situation and therefore no significant installation effort and no user interaction is required, while at the same time a speaking person will be detected and diffuse noise sources will not be detected by the system. As soon as a block of input signals reaches an SRP score of less than the threshold, the system can e.g. be muted or the beam can be kept at the last valid position that gave a maximum SRP score above the threshold. This avoids audio artifacts and detection of unwanted noise sources. The advantage of an SRP threshold over a sound energy threshold is depicted in FIG. 6B. Mostly diffuse noise sources produce a very low SRP score SRPS that is far below the SRP score of sources to be detected, even if they are rather subtle, such as a source referenced by S2. That is, desired audio sources can be detected easier and more reliable by their SRP scores as compared with an SRP threshold, as shown in FIG. 6B, than by their sound energy as compared with a sound energy threshold, as shown in FIG. 6A.

Thus, this gated SRP-PHAT algorithm is robust against diffuse noise sources without the need of tedious setup and/or control by the user.

However, noise sources with a non-diffuse character that are present at the same or higher sound energy level as the wanted signal of a speaking person, might still be detected by the gated SRP-PHAT algorithm. Although the phase transform will result in frequency bins with uniform gain, a source with a high sound energy will still dominate the phase of the systems input signals and thus lead to predominant detection of such sources. These noise sources can for example be projectors mounted closely to the microphone array system or sound reproduction devices used to play back the audio signal of a remote location in a conference scenario. In one aspect of the invention, the pre-defined search grid of the SRP-PHAT algorithm is used to avoid detection of such noise sources. In particular, search grid points corresponding to certain areas may be excluded. If areas are excluded from the search grid, these areas are hidden for the algorithm and no SRP score will be computed for these areas. Therefore, no noise sources situated in such a hidden area will be detected by the algorithm. Especially in combination with the SRP-threshold mentioned above, this is a very powerful solution to make the microphone array system robust against noise sources.

Figure 7A:
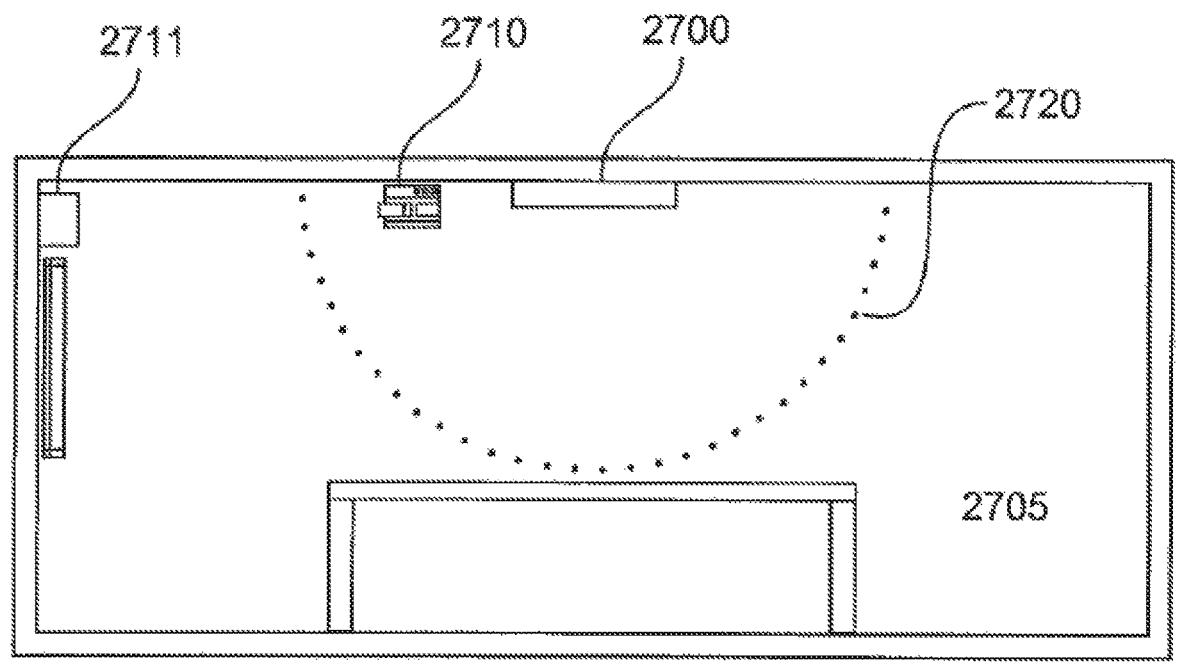
FIG. 7A shows a schematic representation of a conference room according to an example.
Figure 7B:
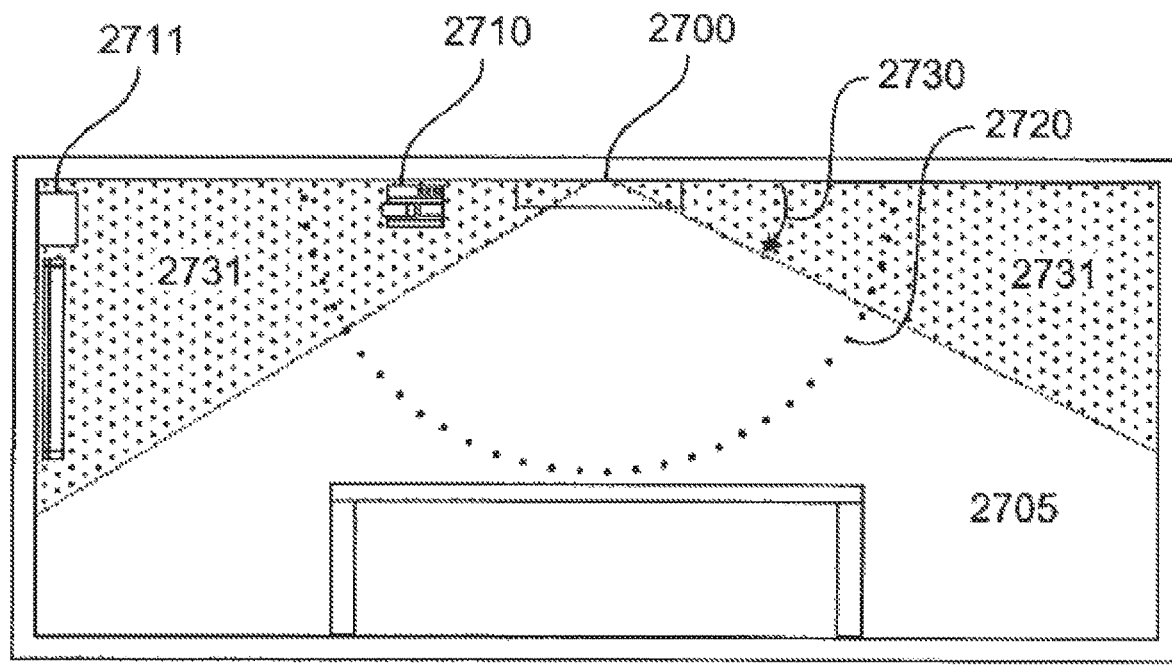
FIG. 7B shows a schematic representation of a conference room according to the invention.

FIG. 7A shows a schematic representation of a conference room according to an example and FIG. 7B shows a schematic representation of a conference room according to an embodiment of the invention.

FIG. 7B explanatory shows the exclusion of detection areas of the microphone array system 2700 in a room 2705 by defining an angle 2730 that creates an exclusion sector 2731 where no search grid points 2720 are located, compared to an unrestrained search grid shown in FIG. 7A. Disturbing sources are typically located either under the ceiling, such as a projector 2710, or on elevated positions at the walls of the room, such as sound reproduction devices 2711. If the search grid points in the direction of the noise sources are excluded, e.g. disabled, these noise sources will be within the exclusion sector and will not be detected by the microphone array system.

The exclusion of a sector of the hemispherical search grid is the preferred solution as it covers most noise sources without the need of defining each noise sources position. This is an easy way to hide noise sources with directional sound radiation while at the same time ensure detection of speaking persons. Furthermore, it is possible to leave out specific areas where a disturbing noise source is located.

Figure 8:
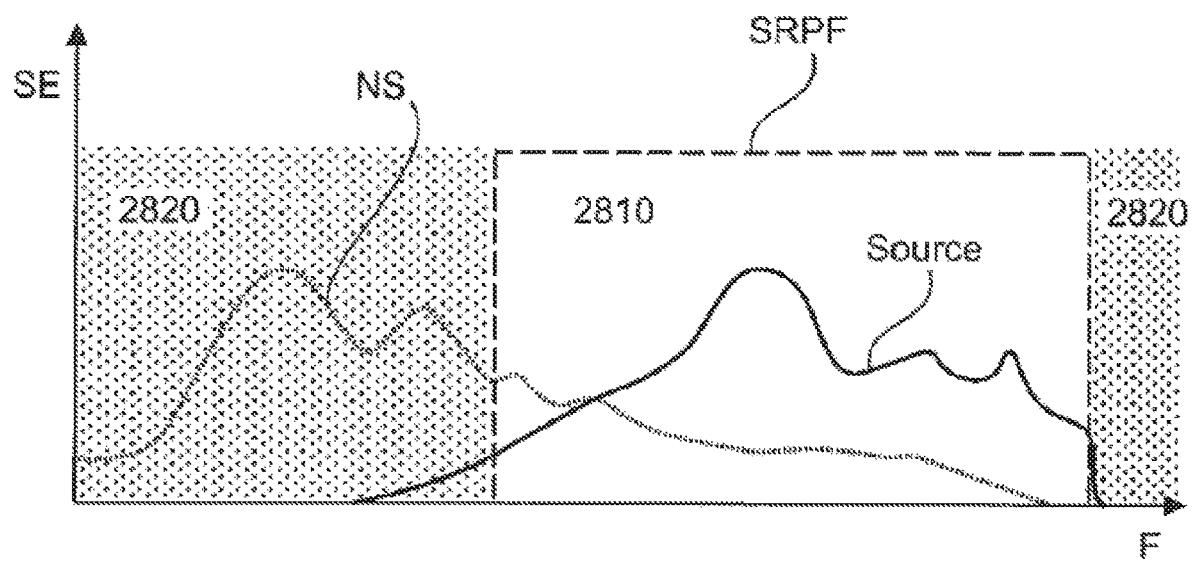
FIG. 8 shows a graph indicating a relation between a sound energy or spectral energy SE and the frequency F.

Another approach for eliminating noise sources with a non-diffuse character that are present at the same or higher sound energy level than the wanted signal of a speaking person is based on spectral energy. FIG. 8 shows a graph indicating a relation between a spectral energy SE or sound energy and the frequency F.

According to this aspect, the invention solves the problem that appears if the exclusion of certain areas is not feasible e.g. if noise sources and speaking persons are located very close to each other. Many disturbing noise sources have most of their sound energy in certain frequency ranges, as depicted in FIG. 8. In such a case, a disturbing noise source NS can be excluded from the source detection algorithm by masking certain frequency ranges 2820 in the SRP-PHAT algorithm. This can be achieved by setting the appropriate frequency bins to zero and only keeping information in the frequency band where most source frequency information is located 2810. This may be performed together with the phase transform in the units 2521-2523. This approach is especially useful for low frequency noise sources.

But even when taken alone this technique is very powerful to reduce the chance of noise sources being detected by the source recognition algorithm. Dominant noise sources with a comparably narrow frequency band can be suppressed by excluding the appropriate frequency band from the SRP frequencies that are used for source detection. Broadband low-frequency noises can also be suppressed very well, as speech has a very wide frequency range and the source detection algorithms as presented works very robust, even when only making use of higher frequencies.

Combining the above techniques allows for a manual or automated setup process, where noise sources are detected by the algorithm and either successively removed from the search grid, masked in the frequency range and/or hidden by locally applying a higher SRP-threshold.

The SRP-PHAT algorithm is capable of detecting a source for each frame of audio input data, independently from sources previously detected. This characteristic allows the detected source to suddenly change its position in space. This is a desired behavior if there are two sources reciprocally active shortly after each other and allows instant detection of each source. However, sudden changes of the source position might cause audible audio artifacts if the array is steered directly using the detected source positions, especially in situations where e.g. two sources are concurrently active. Furthermore it is not desirable to detect transient noise sources such as placing a coffee cup on a conference table or a coughing person. At the same time, these noises cannot be tackled by the features described before.

In embodiments, the source detection unit makes use of different smoothing techniques in order to ensure an output that is free from audible artifacts caused by a rapidly steered beam and robust against transient noise sources while at the same time keeping the system fast enough to acquire speech signals without loss of intelligibility.

The signals captured by a multitude or array of microphones can be processed such that the output signal reflects predominant sound acquisition from a certain look direction while not being sensitive to sound sources of other directions not being the look direction. The resulting directivity response is called beampattern, the directivity around the look direction is called beam, and the processing done in order to form the beam is called beamforming.

One way to process the microphone signals to achieve a beam is a "Delay-and-Sum" beamformer. It sums all the microphones' signals after applying individual delays for the signal captured by each microphone.

Figure 9A:
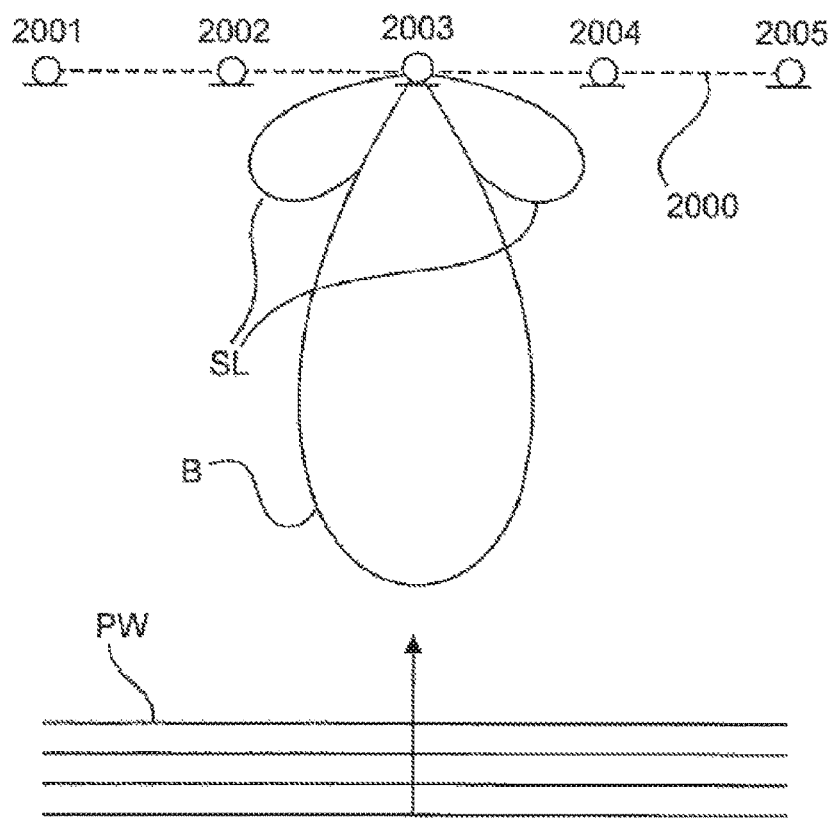
FIG. 9A shows a linear microphone array and audio sources in the far-field.
Figure 9B:
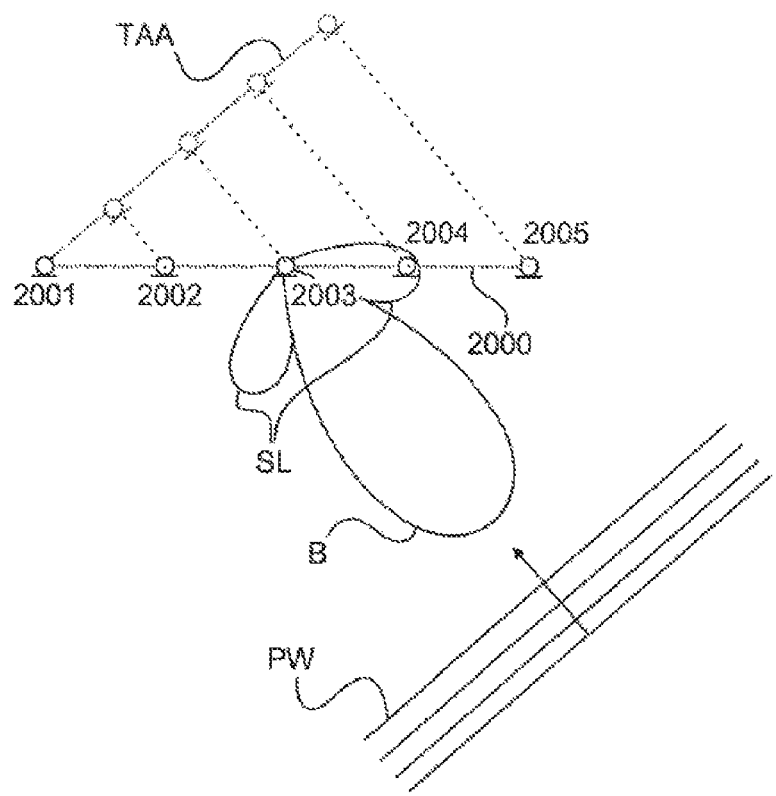
FIG. 9B shows a linear microphone and a plane wavefront from audio sources in the far-field.

For sound coming from audio sources in the far-field, plane wavefronts can be assumed. FIG. 9A shows a linear microphone array 2000 and plane wavefronts PW coming from audio sources in the far-field at an incident angle of about 90°, while in FIG. 9B the plane wavefronts come from an incident angle at about 45°. For a linear array as depicted in FIG. 9A and sources in the far-field, the array 2000 has a beam B perpendicular to the array, originating from the center of the array (broadside configuration) if the microphone signal delays are all equal. By changing the individual delays in a way that the delayed microphone signals from a plane wavefront of a source's direction sum with constructive interference, the beam can be steered. At the same time other directions will be insensitive due to destructive interference. This is shown in FIG. 9B, where the time aligned array TAA illustrates the delay of each microphone capsule 2001-2005 in order to reconstruct the broadside configuration for the incoming plane wavefront.

A delay-and-sum beamformer (DSB) has several drawbacks. Its directivity for low frequencies is limited by the maximum length of the array, as the array needs to be large in comparison to the wavelength in order to be effective. On the other hand, the beam will be very narrow for high frequencies and thus introduces varying high frequency responses if the beam is not precisely pointed to the source and possibly unwanted sound signature. Furthermore, spatial aliasing will lead to sidelobes SL at higher frequencies depending on the microphone spacing. Thus the design of an array geometry is contrary, as good directivity for low frequencies requires a physically large array, while suppression of spatial aliasing requires the individual microphone capsules to be spaced as dense as possible.

In a filter-and-sum beamformer (FSB), the individual microphone signals are not just delayed and summed but, more generally, filtered with a transfer function and then summed. In the embodiments as shown in FIG. 4A and FIG. 4B those transfer functions for the individual microphone signals are realized in the individual filters 2421-2424 or 2425-2428 respectively. A filter-and-sum beamformer allows for more advanced processing to overcome some of the disadvantages of a simple delay-and-sum beamformer.

Figure 10:
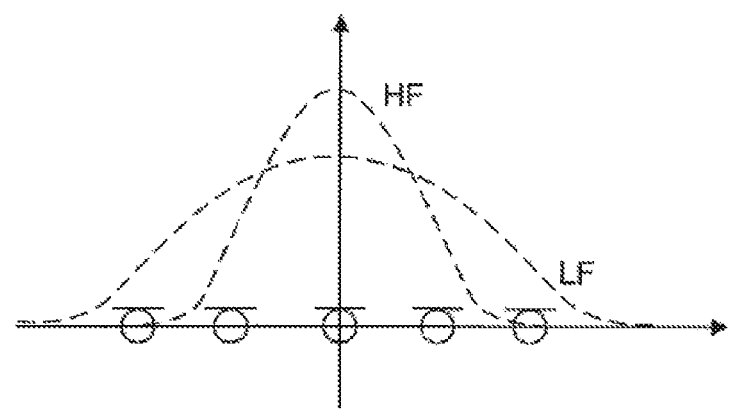
FIG. 10 shows a graph depicting a relation of a frequency and a length of the array.

FIG. 10 shows a graph depicting a relation of a frequency and a length of the array.

By constraining the outer microphone signals to lower frequencies using shading filters, the effective array length of the array can be made frequency dependent, as shown in FIG. 10. By keeping the ratio of effective array length and frequency constant, the beam pattern will be held constant as well. If the directivity is held constant above a broad frequency band, the problem of a too narrow beam can be avoided; such an implementation is called frequency-invariant beamformer (FIB).

Both DSB and FIB are non-optimal beamformers. The "Minimum Variance Distortionless Response" (MVDR) technique tries to optimize the directivity by finding filters that optimize the SNR (signal-to-noise ratio) of a source at a given position and a given noise source distribution with given constraints that limit noise. This enables better low frequency directivity but requires a computationally expensive iterative search for optimized filter parameters.

The microphone array system may comprise a multitude of techniques to further overcome the drawbacks of the prior art.

In a FIB as known from prior art, the shading filters need to be calculated depending on the look direction of the array. The reason is that the projected length of the array is changing with the sound incidence angle, as can be seen in FIG. 9B, where the time-aligned array TAA is shorter than the physical array.

These shading filters however will be rather long and need to be computed or stored for each look direction of the array. The invention, in embodiments, may comprise a technique to use the advantages of a FIB while keeping the complexity very low by calculating fixed shading filters computed for the broadside configuration and factoring out the delays as known from a DSB, depending on the look direction. In this case the shading filters can be implemented with rather short finite impulse response (FIR) filters in contrast to rather long FIR filters in a typical FIB. Furthermore, factoring out the delays gives the advantage that several beams can be calculated very easily, as the shading filters need to be calculated once. Only the delays need to be adjusted for each beam depending on its look direction, which can be done without significant need for complexity or computational resources. The drawback is that the beam gets warped if not pointing perpendicular to the array axis, which however is unimportant in many use cases.

Figure 11:
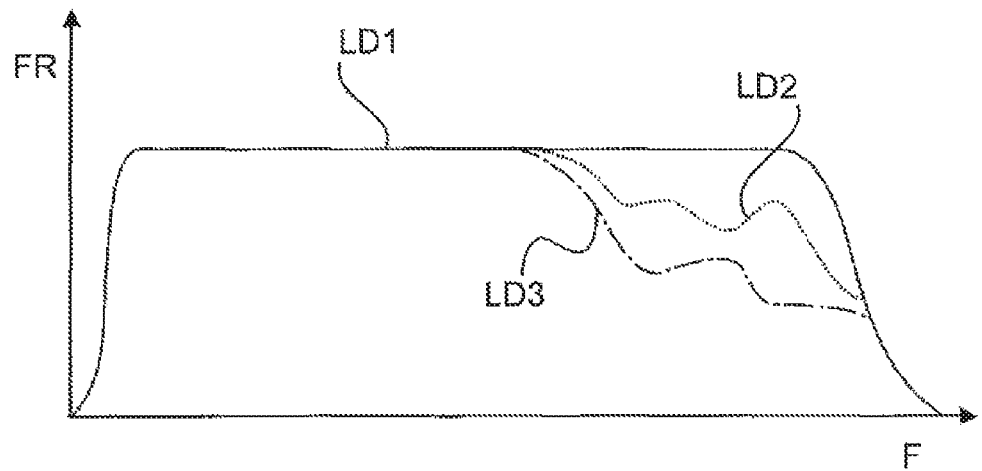
FIG. 11 shows a graph depicting a relation between the frequency response FR and the frequency F.

FIG. 11 shows a graph depicting a relation between the frequency response FR and the frequency F for different look directions LD1-LD3. At higher frequencies, the frequency response is distorted for look directions LD2, LD3 that deviate from the perpendicular look direction LD1. This leads to warping, i.e. a non-symmetrical beam around the look direction, as discussed below.

In the embodiment of the invention as shown in FIG. 4A, the fixed shading filters for the individual microphone signals are realized in the individual filters 2421-2424. Each of those individual filters 2421-2424 features a transfer function that can be specified by an amplitude response and a phase response over the signal frequency. According to an aspect of the invention, the transfer functions of all individual filters 2421-2424 can provide a uniform phase response (although the amplitude response is different at least between some of the different individual filters). In other words, the phase response over the signal frequency of each of those individual filters 2421-2424 is equal to the phase response of each other of those individual filters 2421-2424. The uniform phase response is advantageous as it enables beam direction adjustment simply by controlling the individual delay units 2431-2434 according to the delay-and-sum beamformer (DSB) approach and at the same time utilizes the benefit of an FSB, FIB, MVDR or similar filtering approach. The unified phase response effectuates that audio signals of the same frequency receive an identical phase shift when passing the individual filters 2421-2424 so that the superposition of those filtered (and individually delayed) signals at the summing unit 2450 has the desired effect of adding up for a selected direction and of interfering each other for other directions. The uniform phase response can for instance be achieved by using an FIR filter design procedure that provides linear phase filters and adjusting the phase response to a common shape. Alternatively the phase response of a filter can be modified without altering the amplitude response by implementing additional all-pass filter components into the filter. This can be done for all of those individual filters 2421-2424 for generating a unified phase response without modifying the desired different amplitude responses.

According to an embodiment of the invention, the microphone array system comprises another technique to further improve the performance of the created beam. Typically, an array microphone either uses a DSB, FIB or MVDR beamformer. The benefits of an FIB and MVDR solution may be combined by crossfading both. Such crossfading between an MVDR solution used for low frequencies and a FIB used for high frequencies may combine the better low frequency directivity of the MVDR with the more consistent beam pattern at higher frequencies of the FIB. Using a Linkwitz-Riley crossover filter, as known e.g. from loudspeaker crossovers, maintains magnitude response. The crossfade can be implicitly done in the FIR coefficients without computing both beams individually and afterwards crossfading them. Thus only one set of filters has to be calculated.

Due to several reasons, the frequency response of a typical beam will, in practice, not be consistent over all possible look directions. This leads to undesired changes in the sound characteristics. To avoid this, the microphone array system in one embodiment comprises a steering dependent output equalizer 2460 that compensates for frequency response deviations of the steered beam, as depicted in FIG. 11. If the differing frequency responses of certain look directions are known by measurement, simulation or calculation, a look direction dependent output equalizer that is inverse to the individual frequency response will provide a flat frequency response at the output, independent of the look direction. This output equalizer can further be used to adjust the overall frequency response of the microphone system to preference.

Figure 12:
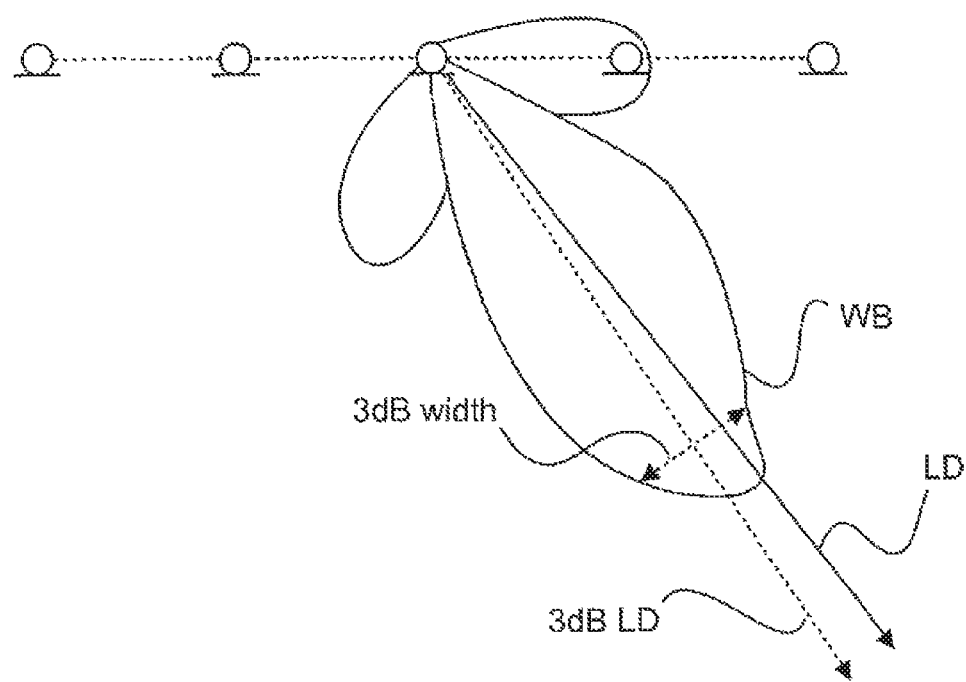
FIG. 12 shows a representation of a warped beam WB according to the invention.

FIG. 12 shows a representation of a warped beam WB according to the invention. Due to warping of the beam, depending on the steering angle, the beam can be asymmetric around its look direction LD. In certain applications it can thus be beneficial to not directly define a look direction LD where the beam is pointed at and an aperture width, but to specify a threshold and a beamwidth, while the look direction and aperture are calculated so that the beam pattern is above the threshold for the given beamwidth. Preferably the −3 dB width would be specified, which is the width of the beam where its sensitivity is 3 dB lower than at its peak position. In FIG. 12, the initial look direction LD is used for calculating the delay values for the delay units 2431-2434 according to the DSB approach. This results in the warped beam WB which leads to a modified resulting look direction "3 db LD". This resulting look direction 3 dB LD is defined as the center direction between the two borders of the warped beam WB that feature a 3 dB reduction compared to the amplitude resulting at the initial look direction LD. The warped beam features a "3 dB width" that is positioned symmetrically to the resulting look direction 3 dB LD. The same concept can, however, be used for other reduction values than 3 dB.

According to an aspect of the invention, the knowledge of the resulting look direction 3 dB LD that results from using the initial look direction LD for calculating the delay values can be utilized for determining a "skewed look direction": Instead of using the desired look direction as initial look direction LD for calculating the delay values, the skewed look direction may be used for calculating the delay values. The skewed look direction is then chosen in a way that the resulting look direction 3 dB LD matches the desired look direction. The skewed look direction can be determined from the desired look direction in the direction recognition unit 2440 for instance by using a corresponding look-up table and possibly by a suitable interpolation.

According to a further aspect of the invention, the concept of the "skewed look direction" can also be applied to a linear microphone array where all microphone capsules are arranged along a straight line. This can be an arrangement of microphone capsules as shown in FIG. 3, but exclusively using the microphone capsules along the lines 2020a and 2020c and optionally the center microphone capsule 2017. The general concept of signal processing as disclosed above for a plain microphone array remains unchanged for the linear microphone array. The major difference is that the audio beam in this case cannot direct to a certain direction, but to a funnel-formed figure around the line of the microphone capsules, and the look direction for the plain array corresponds to an opening angle of the funnel for the linear array.

The microphone array system according to the invention allows for predominant sound acquisition of the desired audio source, e.g. a person talking, utilizing microphone array signal processing. In certain environments like very large rooms and thus very long distances from the source location to the microphone array system, or in very reverberant situations, it might be desirable to have even better sound pickup. Therefore it is possible to combine more than one of the microphone array systems in order to form a multitude of microphone arrays. Preferably each microphone array is calculating a single beam, and an audio mixer selects one or mixes several beams to form the output signal. An audio mixer is available in most conference system processing units and provides the simplest solution to combine multiple arrays. Other techniques for combining the signals of a multitude of microphone arrays are possible as well. For example, the signal of several line and/or planar arrays may be summed. Also, different frequency bands may be taken from different arrays to form the output signal (volumetric beamforming).

It is generally advantageous for the microphone array unit or microphone array system respectively to be ceiling mounted, as mentioned above. In some embodiments, as shown in FIGS. 13-15, the microphone array unit may be implemented as a ceiling tile.

Figure 13:
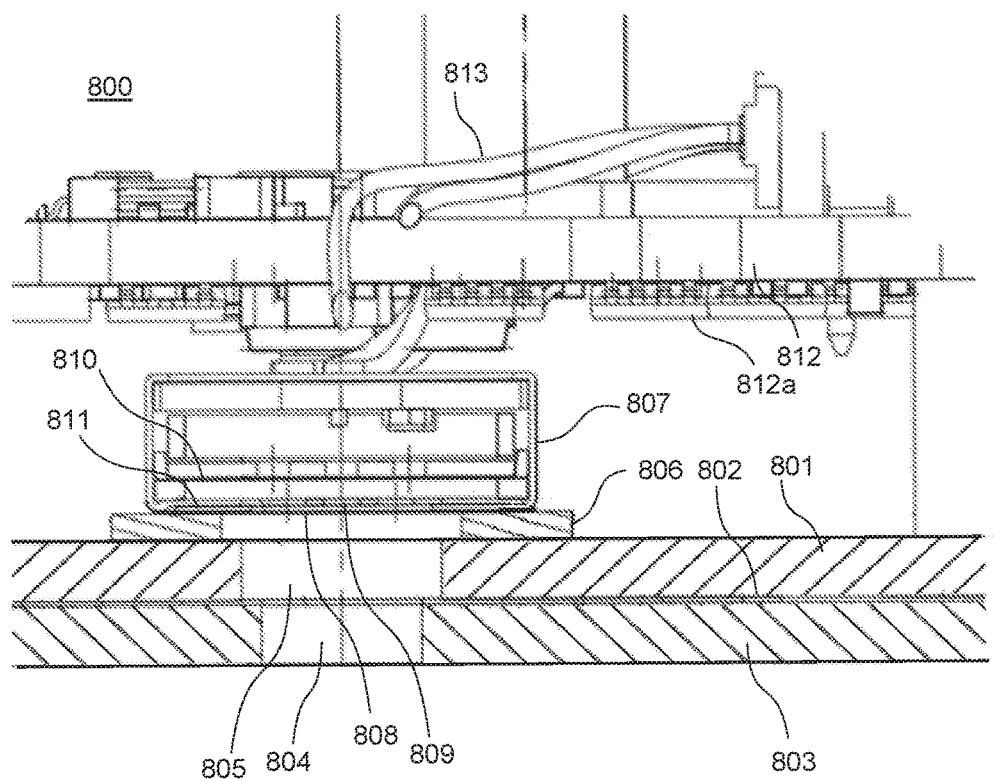
FIG. 13 shows a sectional view of a microphone array system implemented as a ceiling tile.

FIG. 13 shows a sectional view of a microphone array system implemented as a ceiling tile 800, in one embodiment. A microphone capsule 807 shown exemplarily for the plurality of microphone capsules is mounted on a carrier board or front board 801 that looks down to the room from the ceiling. The front board 801 may be made of metal, such as e.g. aluminum. While the front board 801 is hard and sound-reflecting, it has openings 805 through which the sound coming from the room may pass the front board 801 and enter into the microphone capsules 807. During assembly, the microphone capsules 807 are affixed to the front board 801 by an adhesive film 806, such as an adhesive ring. The adhesive film 806 seals the microphone capsule 807 against the board 801, so that sound coming from the back side of the capsule cannot pass through. Hence, sound is exclusively guided through the openings 805 in the front board 801 to the microphone entrances and prevented from reaching any other part inside the chassis. This way of arranging microphone capsules inside the surface of a hard wall is called "boundary microphone".

Later in the assembly process, the microphone capsules 807 are connected by flexible connection wires 813 to a printed circuit board (PCB) 812 carrying electronic components 812a, which is mounted behind the capsules. Thus, the microphone capsules 807 are independent from the PCB 812 and therefore easy to align with the openings 805 of the front board. Also, possible mechanical vibrations of the PCB do not reach the capsules. Moreover, the PCB 812 may be easily exchanged without modifying the positions of the microphone capsules 807, since they are fixed to the front board 801. The front board 801 may have further holes that will be closed during assembly, e.g. by screws or pins. Optionally, an acoustically transparent gauze 802 may cover the openings 805 for the microphone capsules in the front board 801. Finally, an optional decorative cover 803 that is also sound-reflecting and has openings 804 may be added on the downside of the tile that faces the room. Each microphone capsule 807 may be covered by a dust protection fabric 808 that is attached to the capsule by a second adhesive ring 811. The dust protection fabric 808 is acoustically transparent and may be made of, e.g., a PET material with pores having a pore size of 41 μm+/−5 μm. Each microphone capsule 807 has one or more openings 809 towards the opening 805 of the front board 801, so that sound coming from the room and entering the capsule 807 through the openings 805, 809 can reach the diaphragm 810 inside the capsule.

Figure 14A:
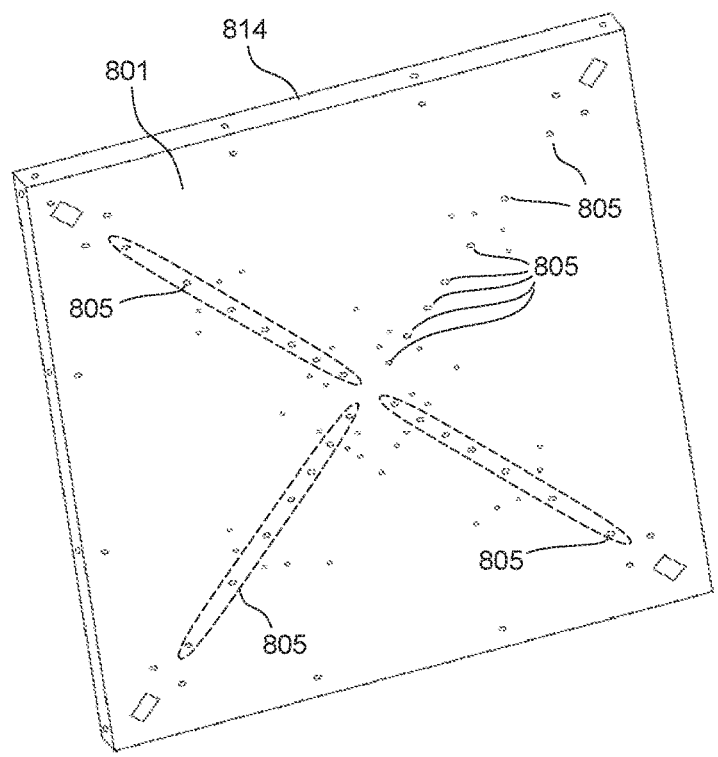
FIG. 14A shows a bottom view of a chassis of a microphone array system.

The front board 801 is part of a chassis of the microphone array system. FIG. 14A shows a bottom view (i.e. a view from the lower side that after mounting faces the room) of the chassis with the front board 801 and side walls 814. The front board 801 has openings 805 for sound to reach the microphone capsules mounted on the other side (i.e. upper side) of the front board and various other openings, some of which will be described below. The openings 805 for sound entrance are in this example arranged on straight lines in an X-shape, with distances between them as described above. The straight lines of openings 805 are marked by dashed lines in FIG. 14A.

Figure 14B:
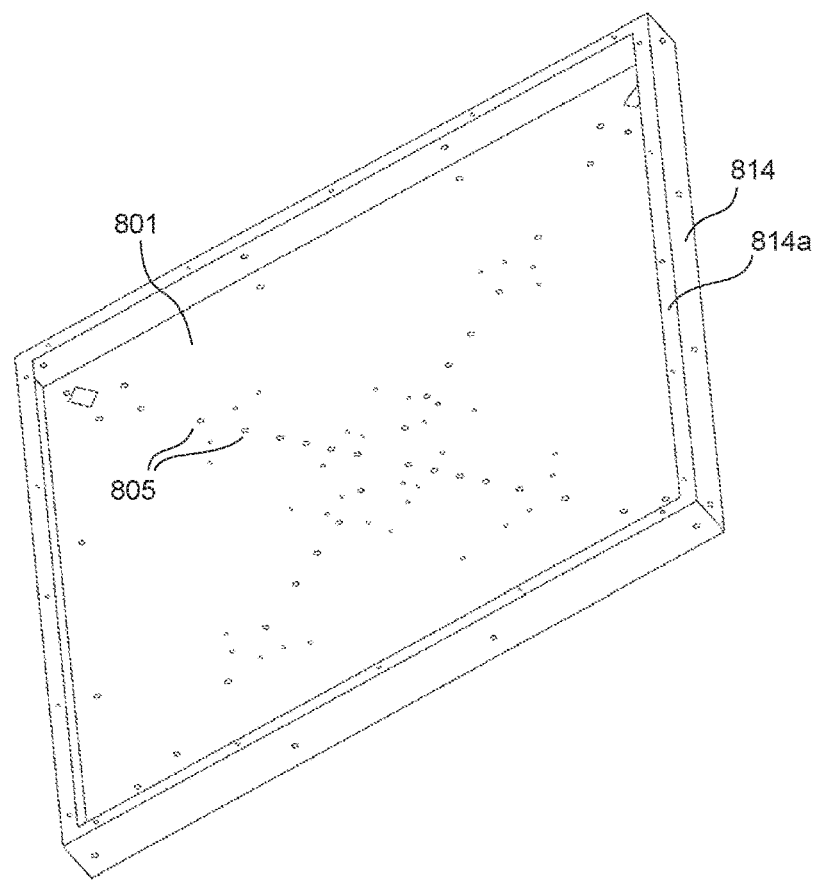
FIG. 14B shows a top view of a chassis of a microphone array system.

FIG. 14B shows a top view of the chassis of the microphone array system before mounting the microphone capsules 807 and the PCBs 812 with electronic components 812a. The side walls 814 may have boreholes and a flange 814a for fixing a back wall.

Figure 14C:
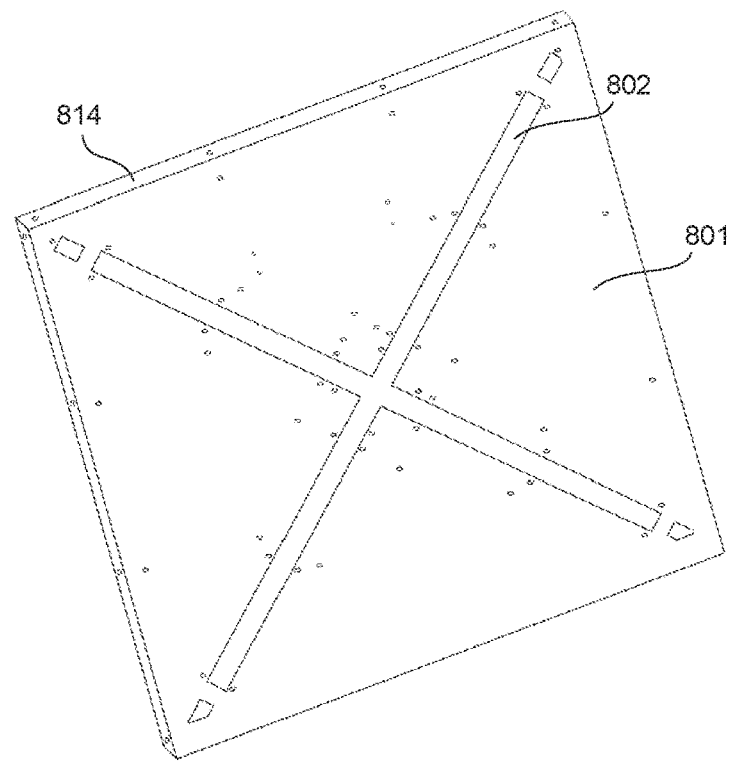
FIG. 14C shows a bottom view of a chassis with X-shaped gauze.

As mentioned above, an acoustically transparent gauze 802 may be attached to the front board 801 so as to cover the openings 805 for sound entrance. In one embodiment, the gauze is attached to the downside or outside of the front board 801, as shown in FIG. 14C in a bottom view of a chassis with the X-shaped gauze 802. Alternatively, it may be attached as a different layer, e.g. to the upside or inside of the front board 801 or to the decorative cover board 803.

Figure 14D:
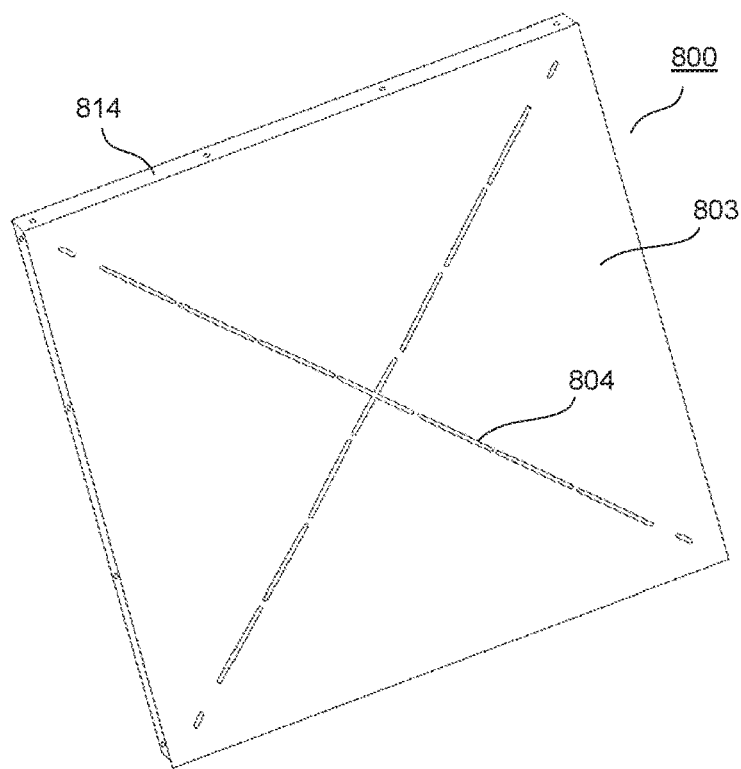
FIG. 14D shows a bottom view of a microphone array system with a front cover board.

FIG. 14D shows a bottom view of the microphone array system 800 with an optional decorative cover board 803 mounted. Since the cover board 803 in one embodiment is also sound-reflecting, it has openings 804 such as slits, behind which the openings 805 for sound entrance, the gauze 802 and the microphone capsules 807 are positioned. Thus, sound can reach the microphone capsules 807 through the openings 804, 805 and the gauze 802. Due to the sound-reflection property, the above-mentioned so-called boundary effect of a pressure gain up to 6 dB at the surface, and the related SNR increase, occur also on the cover board 803. The cover board 803 is firmly attached to the carrier board 801, e.g. by screws. At openings of the cover board 803, such as the slits 804, the sound-reflection and the boundary effect are effected by the underlying carrier board 801. Alternatively, other front covers that are transparent for sound may be used. Also in this case it is advantageous that the carrier board or front board 801 is sound-reflecting, so that the boundary effect and 6 dB pressure gain occurs on its surface. The cover board 803 may be an aluminum plate of e.g. 1.5 mm thickness.

Figure 14E:
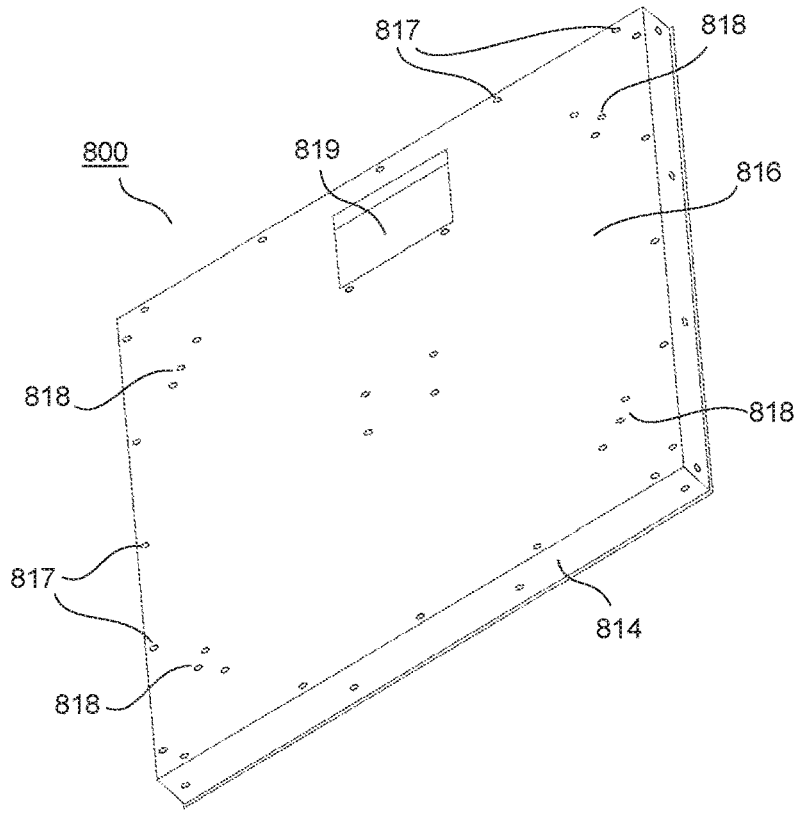
FIG. 14E shows a top view of a microphone array system with a back wall attached to the chassis.

FIG. 14E shows a top view (i.e. the side facing the ceiling) of a microphone array system 800 with a back plate 816 attached to the chassis. In particular, the back plate 816 may be screwed through holes 817 to the flange 814a of the side walls 814 of the chassis. The back plate 816 may have further openings 818 for various types of mounting supports, as described below. Further, the back plate 816 may have an opening 819 through which electrical connectors (not shown) on the PCB 812 are accessible.

Figure 15A:
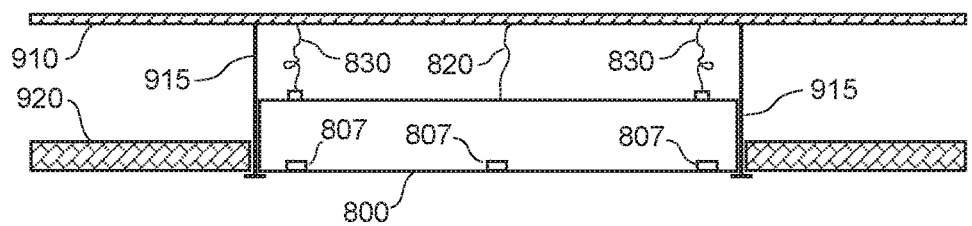
FIG. 15A shows a ceiling mounted microphone array system in a first configuration.

Various different mounting configurations on or in a ceiling are possible for the microphone array system. Four advantageous examples are explained in the following. FIG. 15A shows a ceiling mounted microphone array unit 800 in a first configuration. The actual ceiling 910 of the room is lowered by a drop ceiling 920, which is fixed to the actual ceiling 910 by a frame of T-shaped support beams 915. The microphone array unit 800 has about the size of a ceiling tile so that it may be put into the frame, thereby replacing a ceiling tile. Since it may be heavier than a conventional ceiling tile, it may be additionally fixed by security connectors 830 to the actual ceiling 910 so as to prevent accidental drops. The security connectors 830 may normally be unstressed so that they are easily mountable. Rubber feet (not shown) may optionally be inserted between the support beam 915 and the microphone array unit 800 in order to reduce structure-borne noise, e.g. impact sound transmitted via the ceiling 910 or room sound transmitted via adjacent elements of the drop ceiling 920. The microphone array unit 800 may be electrically connected through cables 820 running above the tile level. In the first configuration shown in FIG. 15A, the microphone array unit 800 is flush mounted (as seen from the room), so that the sound-reflecting front cover 801 (or decorative cover 803), the microphone capsules 807 and the lower side of the drop ceiling tiles 920 are substantially in the same plane.

Figure 15B:
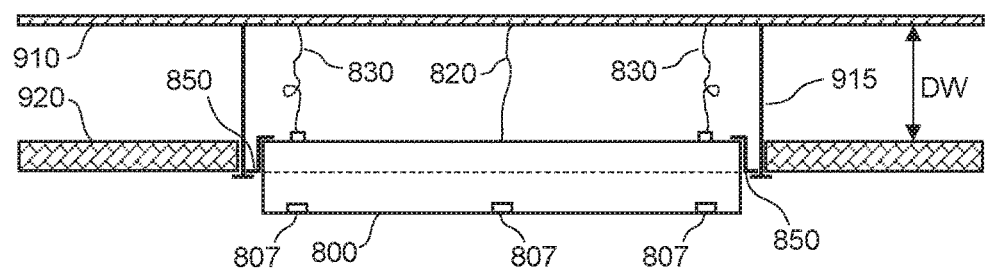
FIG. 15B shows a ceiling mounted microphone array system in a second configuration.

FIG. 15B shows a ceiling mounted microphone array unit 800 in a second configuration, where the microphone array unit is positioned slightly lower than in the first configuration. In the second configuration, the sound-reflecting front cover 801 (and/or decorative cover 803) and the microphone capsules 807 are slightly below the lower edge of the drop ceiling tiles 920. However, the upper edge of the microphone array unit 800 may be substantially flush with the upper edge of the ceiling tiles 920, which may be advantageous for ventilation and may simplify cabling work in the drop space. In particular, the drop space may have a substantially constant drop space width DW, even if the microphone array unit 800 is thicker than the ceiling tiles 920. This holds independent from whether or not the carrier board that the microphone capsules are fixed to is a front carrier board or somewhere within the microphone array unit. In the second configuration, the microphone array unit 800 may be fixed by a support frame 850 that is attached to it. E.g., the support frame 850 may have a Z-shaped or L-shaped cross section and may be fixed by screws through the holes 817 to the back wall 816 or to the side walls 814. The support frame 850 may rest on the support beams 915, optionally with rubber feet in between (not shown). In this example, the height of the support frame 850 is less than the height of the microphone array unit 800, so that a lower portion of the microphone array unit 800 that comprises at least the microphone capsules 807 is not flush with the lower edge of the ceiling tiles. Alternatively, the support frame 850 may be higher, so that the front cover 801, or decorative cover 803 respectively, of the microphone array unit 800 is flush with the lower edge of the ceiling tiles. In both cases, an advantage of the support frame 850 is that it can be used for mounting in cases where the spacing between the support beams 915 is larger than the side length of the microphone array unit 800, e.g. a 2-foot by 2-foot grid or a 625 mm×625 mm grid instead of a 600 mm×600 mm grid. Optionally, the microphone array unit 800 may have a square shape with a side length of about 590 mm, i.e. a side length slightly less than a side length of ceiling tiles, since this is advantageous for mounting the microphone array unit 800.

Figure 15C:
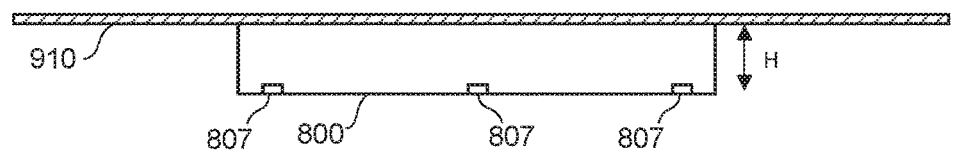
FIG. 15C shows a ceiling mounted microphone array system in a third configuration.

FIG. 15C shows a ceiling mounted microphone array unit 800 in a third configuration where it is mounted directly to the ceiling 910, e.g. by using angle brackets. Thus, a distance between the lower edge of the ceiling 910 and the plane of the microphone capsules 807 is very small, namely substantially equal to the height H of the microphone array unit 800. This configuration is appropriate if no drop ceiling is available. In the first, second and third configurations, ceiling tiles that are adjacent to the microphone array unit 800 may advantageously extend its sound-reflecting surface, thereby supporting the above-described boundary effect.

Figure 15D:
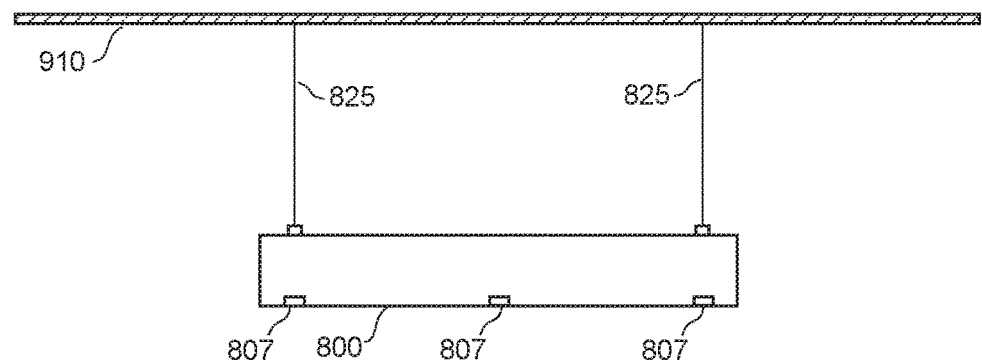
FIG. 15D shows a ceiling mounted microphone array system in a fourth configuration.

FIG. 15D shows a ceiling mounted microphone array unit in a fourth configuration, where it is mounted to a ceiling 910 by suspension wires 825. The suspension wires 825 may be fixed e.g. to holes 818 in the back plate described above. Cables for electrical connection can be fixed to the suspension wires 825, or the microphone array unit 800 may be connected wirelessly. This fourth configuration is advantageous e.g. in rooms where the ceiling 910 is very high, so that for the above-described configurations the sound sources would be far away and the detection angles between different sound sources as seen from the ceiling would be very low. Thus, the SNR is increased. Further, more reflections from side walls would occur with the above-described configurations. The fourth configuration spreads the detection angles and reduces reflections from side walls. However, the fourth configuration is different from the first, second and third configurations in terms of acoustics, since no ceiling tiles that might extend the boundary effect are adjacent to the microphone array unit 800, and less or no corner reflections occur. Thus, a different type of filtering may be applied to the acquired signals. In one embodiment, the signal processing within the microphone array unit 800 comprises configuration dependent filtering and an interface suitable for programming the processing unit according to a current mounting configuration. E.g. if the microphone array unit 800 is programmed for the fourth configuration, a different filtering may be applied than for the first, second or third configuration. In one embodiment, a different type of filtering and/or processing may be used for each configuration.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. For example, for some applications it may be advantageous for the microphone array unit to have a rectangular non-square shape, e.g. for replacing a rectangular non-square ceiling tile. The X-shape of the lines of microphone capsules or the angle between them may be stretched or compressed, e.g. for the microphone array unit to be operated in a long and narrow room. Various changes may be made without departing from the spirit and scope of the inventions as defined in the following claims.

The invention claimed is:

1. A microphone array system mountable on or in a ceiling of a conference room, the microphone array system comprising:
    a front board made of a sound-reflecting material, the front board comprising an upper side, a lower side and a plurality of first openings;
    side walls extending on the upper side of the front board;
    a plurality of microphone capsules arranged in or on the front board, wherein the microphone capsules are located at the first openings of the front board, and wherein each microphone capsule is sealed against the front board, and wherein the microphone capsules can acquire only sound entering through the first openings of the front board; and
    a processing unit which is configured to receive output signals of the microphone capsules and to execute audio beam forming based on the received output signals of the microphone capsules for predominantly acquiring sound coming from an audio source in a first direction.

2. The microphone array system according to claim 1, wherein the microphone capsules are attached to the upper side of the front board by an adhesive film.

3. The microphone array system according to claim 1, further comprising a gauze and a cover board mounted on the lower side of the front board, the cover board having a sound-reflecting surface and second openings that are aligned with the first openings of the front board, wherein the gauze is acoustically transparent and covers at least the first openings.

4. The microphone array system according to claim 1, wherein each microphone capsule has one or more third openings for sound entrance and wherein the microphone capsules are arranged for the third openings to be directed towards the first openings of the front board.

5. The microphone array system according to claim 1, further comprising a back plate mounted on the side walls, wherein the plurality of microphone capsules, the side walls and at least a part of the processing unit are arranged between the front board and the back plate.

6. The microphone array system according to claim 1, wherein the front board has a substantially square shape and a side length slightly less than a side length of a ceiling tile, so as to be mountable in a drop ceiling.

7. The microphone array system according to claim 1, further comprising a support frame mounted on the side walls or mounted on a back plate that is mounted on the side walls, wherein the support frame has a height that is less than a height of the microphone array system and a side length that is larger than a side length of the microphone array system.

8. The microphone array system according to claim 1, further comprising a support frame mounted on the side walls or mounted on a back plate that is mounted on the side walls, wherein the support frame has a height that is substantially equal to a height of the microphone array system and a side length that is larger than a side length of the microphone array system.

9. The microphone array system according to claim 1, further comprising security connectors adapted for being mounted on the ceiling, wherein the security connectors are adapted for preventing accidental drops of the microphone array system.

10. The microphone array system according to claim 9, wherein the security connectors are unstressed in a regular configuration.

11. The microphone array system according to claim 1, wherein the front board is made of metal, in particular of aluminum.

12. The microphone array system according to claim 1, wherein the processing unit comprises a filter and an interface, wherein the filter is adapted for filtering audio signals acquired by the microphone capsules, and wherein the interface is adapted for receiving mounting configuration information and for modifying the filter according to the received mounting configuration information.

13. The microphone array system according to claim 1, wherein the processing unit comprises a direction recognition unit, a delay control unit receiving input from the direction recognition unit, and for each of the output signals of the microphone capsules a delay unit receiving input from the delay control unit, wherein the direction recognition unit is configured to compute from the output signals of said microphone capsules a score for each of a plurality of spatial positions on a search grid and use a search grid position having a highest score to identify said first direction, and wherein the delay control unit calculates individual delay values for each of the delay units according to said first direction.

14. The microphone array system according to claim 13, wherein the direction recognition unit uses said search grid position having a highest score to identify said first direction only said highest score is above a predefined threshold, and otherwise maintains a previously determined direction.

15. The microphone array system according to claim 13, wherein the direction recognition unit detects said direction based on the output signals of a subset of the microphone capsules of the microphone array system, and the audio beam forming is based on the output signals of all the microphone capsules of the microphone array system.

16. The microphone array system according to claim 13, wherein the direction recognition unit is configured to periodically re-compute the scores for the spatial positions of the search grid and further to re-identify a search grid position having a highest score and to re-adjust the audio beam forming accordingly.

* * * * *